United States Patent [19]
Funaki et al.

[11] Patent Number: 5,476,899
[45] Date of Patent: Dec. 19, 1995

[54] PROCESS FOR PRODUCE A READILY SLIDABLE FILM

[75] Inventors: Keisuke Funaki, Ichihara; Yuichi Ohki, Himeji; Hideyuki Takama, Tokyo, all of Japan

[73] Assignee: Idemitsu Kosan Co., Ltd., Tokyo, Japan

[21] Appl. No.: 168,273

[22] Filed: Dec. 15, 1993

Related U.S. Application Data

[63] Continuation of Ser. No. 991,505, Dec. 17, 1992, abandoned, which is a continuation of Ser. No. 684,926, Apr. 17, 1991, abandoned.

[30] Foreign Application Priority Data

| Sep. 14, 1989 | [JP] | Japan | 1-236896 |
| Sep. 22, 1989 | [JP] | Japan | 1-245224 |
| Sep. 29, 1989 | [JP] | Japan | 1-251784 |
| Oct. 9, 1989 | [JP] | Japan | 1-261952 |
| Oct. 9, 1989 | [JP] | Japan | 1-261954 |
| Oct. 18, 1989 | [JP] | Japan | 1-269089 |

[51] Int. Cl.$^6$ ............................................ C08L 25/06
[52] U.S. Cl. ............. 524/577; 524/413; 524/423; 524/427; 524/432; 524/496; 524/497; 264/167; 264/170; 264/171.1; 526/347.2
[58] Field of Search ................... 524/423, 413, 524/427, 432, 433, 436, 437, 442, 451, 496, 497, 577; 264/167, 170, 171; 526/347.2

[56] References Cited

U.S. PATENT DOCUMENTS

| 5,034,441 | 7/1991 | Nakano et al. | 524/117 |
| 5,109,068 | 4/1992 | Yamasaki et al. | 525/151 |
| 5,171,834 | 12/1992 | Funaki | 528/493 |

FOREIGN PATENT DOCUMENTS

| 1276748 | 11/1990 | Canada . |
| 0291915 | 11/1988 | European Pat. Off. . |
| 0318794 | 6/1989 | European Pat. Off. . |
| 62-104818 | 5/1987 | Japan . |
| 1110122 | 4/1989 | Japan . |
| 1262132 | 10/1989 | Japan . |

OTHER PUBLICATIONS

Patent Abstracts of Japan, vol. 7, No. 199 (M–240) (1344) Sep. 3, 1983 of JP 58–098 222, Jun. 11, 1983.

*Primary Examiner*—Paul R. Michl
*Assistant Examiner*—John J. Guarriello
*Attorney, Agent, or Firm*—Frishauf, Holtz, Goodman, Langer & Chick

[57] ABSTRACT

A process for the production readily slidable films which are stretched films. The process comprises (a) uniaxially stretching in a machine direction a pre-molded product comprising a composition of a styrene polymer having a high degree of syndiotactic configuration compounded with 0.001 to 1% by weight of inorganic filler particles with an average particle diameter of 0.01 to 3 μm, or simultaneously, biaxially stretching the premolded product in the machine direction and the transverse direction and (b) subsequently uniaxially restretching the premolded product in the traverse direction or simultaneously, biaxially restretching the premolded product in the machine direction and the transverse to produce a film having a surface roughness Ra of 0.005 to 0.03 μm, and a static friction coefficient μs of 0.3 to 1.0. The readily slidable films have high heat resistance, mechanical strength and electrical insulating properties and are excellent in sliding properties and smoothness.

15 Claims, No Drawings

PROCESS FOR PRODUCE A READILY SLIDABLE FILM

This application is a continuation of application Ser. No. 07/991,505 filed Dec. 17, 1992, (abandoned), which is a continuation of application Ser. No. 07/684,926 filed Apr. 17, 1991 (abandoned), which is the United States national phase application of International Application No. PCT/JP90/01174 filed Sep. 13, 1990.

FIELD OF THE INVENTION

The present invention relates to a readily slidable film and a process for production thereof, more specifically, it relates to a readily slidable film having high heat resistance, chemical resistance, electrical insulating properties, mechanical properties and the like and excellent in sliding properties and smoothness, and an process for efficient production thereof.

BACKGROUND OF THE INVENTION

Recently, demands for various kinds of films for industrial use have been increased, and production of films having excellent heat resistance and mechanical properties has been required. Particularly, films for magnetic tape base has been expected to be highly improved in mechanical strength, especially, mechanical strength in machine direction. Generally, in plastic films, thinner films are required to have better processability and sliding properties. Particularly, as for industrial films such as magnetic tapes, techniques which mainly comprises addition of particles to various resins to satisfy both requirements of smoothness and sliding properties have been developed. However, with the recent spread of video tapes, much smaller video tapes with higher picture quality which can record for longer period of time have been required, and techniques by depositing magnatic materials, particularly by vertical magnetization have attracted attention and developed. In such techniques using deposition, surface of the base film is required to have high smoothness and heat resistance. Further, with recent densification, films with better smoothness have been required.

Among them, some films of polyethylene terephthalate (PET) which satisfy high smoothness and sliding properties have been developed with the progress in film-forming technique. However, they have problems, for example, poor heat resistance during deposition of magnetic materials, separation of oligomers, hydrolysis under high humidity and dimensional change and the like, further the tape may be stretched at a temperature over its glass transition temperature, producing problems in the usage in a car, where the tape may be exposed to a higher temperature.

Recently, styrene polymer having a high degree of syndiotactic configuration has been developed (Japanese Patent Application Laid-Open No. 104818/1987). A film made of said styrene polymer is excellent in heat resistance, dimensional stability, electrical insulating properties and the like, and expected to be widely used, particularly favorable as an industrial film.

When a film is produced using this styrene polymer having a high degree of syndiotactic configuration as a raw material, its mechanical strength in machine direction (MD) can be greatly improved by uniaxial stretching, whereas it tends to be torn in MD direction. Production of the film by the conventional simultaneous or sequential, biaxial stretching results in improvement of mechanical strength in all directions, providing relatively well balanced film. However, attempts to improve mechanical strength in a specific direction may be inevitably accompanied with deterioration of strength in the direction vertical to said specific direction. Accordingly, it was difficult to produce films which completely satisfy mechanical strength in MD required for films for magnetic tape bases.

Japanese Patent Application Laid-Open No. 110122/1989 discloses a process for the production of a film of styrene polymer having a high degree of syndiotactic configuration. However, it is difficult to greatly improve mechanical strength in MD by this method, which is particularly utilizing simultaneous, biaxial stretching with a tenter frame by batch process. Further, production efficiency of the stretched film is insufficient. Moreover, it is difficult to continuously produce product with uniform quality.

As for production process of a film by calendering, especially a process which comprises calendering a composition of the above styrene polymer having a high degree of syndiotactic configuration, concrete calendering operations, conditions and the like have not been established.

The films of styrene polymer having a high degree of syndiotactic configuration which are produced by such conventional methods have problems in mechanical strength, as mentioned above, and further have insufficient smoothness and sliding properties. Films having such physical properties and excellent in surface tension have not been developed.

DISCLOSURE OF THE INVENTION

The present inventors have studied intensively to eliminate the above problems and to develop films which have high physical properties such as heat resistance, mechanical strength, and are excellent in smoothness and slidability, and further to develop an process for efficient production thereof.

An object of the present invention is to provide a readily slidable film having high physical properties such as heat resistance, mechanical strength and excellent in smoothness and sliding properties.

Another object of the present invention is to provide a process to efficiently produce the above readily slidable film.

Still another object of the present invention is to provide a process to improve surface tension of the above readily slidable film.

As a result of study from such point of view, it has been found that the above objects is attained by monolayer or laminate film having specific surface properties which is prepared using a styrene polymer having a high degree of syndiotactic configuration as a main starting material. Further, it has been found that the objective film can be efficiently produced by a step which mainly comprises two-stage stretching or one-stage calendering under a specific condition using a styrene polymer having a high degree of syndiotactic configuration as a main starting material.

The present invention has been accomplished on the basis of such findings.

That is, the present invention provides a readily slidable film which is characterized by having surface roughness Ra of 0.005 to 0.03 μm, and static friction coefficient μs of 0.3 to 1.0, said film being a stretched film which comprises a composition of a styrene polymer having a high degree of syndiotactic configuration compounded with 0.001 to 1% by weight of fine particles of an inorganic substance with an average particle diameter of 0.01 to 3 μm. Further, the present invention provides a readily slidable film which is a film prepared by laminating a layer comprising a composition of styrene polymer having a high degree of syndiotactic configuration compounded with fine particles of an inorganic substance on one side of a layer which mainly containing styrene polymer having a high degree of syndiotactic configuration and containing residual aluminum of not more than 3,000 ppm, residual titanium of not more than 10 ppm and residual styrene monomer of not more than 7,000 ppm, wherein the one side is rough and the other is smooth, surface roughness Ra of said smooth surface being 0.001 to 0.02 μm, and the ratio of surface roughness of said rough surface to that of said smooth surface being 1.5 to 10, and static friction coefficient μs being 0.3 to 1.0. Further, the present invention provides a readily slidable film which is a film prepared by laminating a resin layer containing inorganic particles on one side of a layer which mainly containing styrene polymer having a high degree of syndiotactic configuration and containing residual aluminum of not more than 3,000 ppm, residual titanium of not more than 10 ppm and residual styrene monomer of not more than 7,000 ppm, wherein the one side is rough and the other is smooth, surface roughness Ra of said smooth surface being 0.001 to 0.02 μm, and the ratio of surface roughness of said rough surface to that of said smooth surface being 1.5 to 10, and static friction coefficient Us being 0.3 to 1.0.

The present invention provides a process for the production of the readily slidable film, which comprises uniaxial stretching in MD or simultaneous, biaxial stretching in MD and TD (transverse direction) of a pre-molded product for stretching comprising a styrene polymer having a high degree of syndiotactic configuration or a composition thereof, followed by uniaxial stretching in TD or simultaneous, biaxial stretching in MD and TD. Further, the present invention provides a process for the production of the readily slidable film wherein a pre-molded product for stretching which comprises a styrene polymer having a high degree of syndiotactic configuration or a composition thereof is simultaneously, biaxially stretched in MD and TD under heating, and further re-stretched in MD. Moreover, the present invention provides a process for production of the readily slidable film wherein heat treatment is carried out after the aforementioned process.

The present invention provides a process for production of a rolled film, wherein a pre-molded product obtained by extrusion or press molding of a styrene polymer having a high degree of syndiotactic configuration or a composition thereof is cooled and rolled to bring decrease of thickness within the range from 1 to 30%. The present invention further provides a process for the production of the readily slidable film, wherein the film obtained by any one of the aforementioned processes is chemically and/or physically treated to bring surface tension partially or totally not less than 35 dyne/cm.

BEST MODE OF THE INVENTION

Here, a styrene polymer having a high degree of syndiotactic configuration which is a starting material used in the present invention means a styrene polymer wherein stereochemical structure is a high degree of syndiotactic configuration, that is, the stereostructure in which phenyl groups or substituted phenyl groups as side chains are located alternately in opposite directions relative to the main chain consisting of carbon-carbon bonds. Its tacticity is quantitatively determined by the nuclear magnetic resonance method ($^{13}$C-NMR method) using carbon isotope. The tacticity measured by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrene polymer having a high degree of syndiotactic configuration in the present invention includes the following polymer having such syndiotacticity that the proportion of racemic diad is at least 75%, preferably at least 85%, or proportions of racemic pentad is at least 30% and preferably at least 50%; namely, polystyrene, poly(alkylstyrene), poly(halogenated styrene), poly(alkoxystyrene), poly(vinyl benzoate), hydrogenated polymers thereof and a mixture thereof, or copolymers containing these structural units. The poly(alkylstyrene) includes poly(methylstyrene), poly(ethylstyrene), poly(propylstyrene), poly(butylstyrene), poly(phenylstyrene), poly(vinylnaphthalene), poly(vinylstyrene), poly(acenaphthylene) and the like; and the poly(halogenated styrene) includes poly(chlorostyrene), poly(bromostyrene), poly(fluorostyrene) and the like. The poly(alkoxystyrene) includes poly(methoxystyrene), poly(ethoxystyrene) and the like. Of these, a particularly preferred styrene polymer includes polystyrene, poly(p-mehtylstyrene), poly(m-methylstyrene), poly(p-tertbutylstyrene), poly(p-chlorostyrene), poly(m-chlorostyrene), poly(p-fluorostyrene) and further a copolymer of styrene and p-methylstyrene (see Japanese Patent Application Laid-Open No. 187708/1987).

Comonomer of the styrene copolymer includes, in addition to the above-described monomer of styrene polymer, olefin monomer such as ethylene, propylene, butene, hexene, octene; diene, monomer such as butadiene, isoprene; cyclic diene monomer or polar vinyl monomer such as methyl methacrylate, maleic anhydride, acrylonitrile.

Molecular weight of the styrene polymer is not particularly limited, but the styrene polymers have preferably a weight average molecular weight of 10,000 to 3,000,000, and more preferably 50,000 to 1,500,000. When weight average molecular weight is less than 10,000, the polymer may not be sufficiently stretched. Further, the range of molecular-weight distribution is not limited and various styrene polymer can be used. The value of weight average molecular weight (Mw)/number average molecular weight (Mw) is preferably 1.5 to 8. The styrene polymer having a high degree of syndiotactic configuration is much superior in heat resistance to the conventional styrene polymer having an atactic configuration.

Among them, styrene polymers having melt viscosity of $1\times10^2$ to $1\times10^6$ poise at 300° C. and at shear rate of 200/sec are particularly preferred.

The styrene polymer having a high degree of syndiotactic configuration can be produced by polymerization of styrene monomers (monomer corresponding to the above polymers) using (A) a titanium compound and (B) a condensation product of water and an organic aluminum compound, particularly, trialkylaluminum as a catalyst in, for example, an inert hydrocarbon solvent, or in the absence of a solvent (Japanese Patent Application Laid-Open No. 187708/1987). Poly(halogenated alkylstyrene) and hydrogenated polymer thereof are disslosed in Japanese Patent application Laid-Open Nos. 146912/1989 and 178505/1989, respectively.

The methods for the production of the starting material used in the present invention, i.e., the styrene polymer of high purity with less impurity content wherein the residual aluminum content is not more than 3,000 ppm, preferably not more than 1,000 ppm, the residual titanium content is not more than 10 ppm, preferably not more than 7 ppm, and the residual styrene mononer content is not mote than 7,000 ppm, preferably not more than 5,000 ppm have a wide variety as shown below. Firstly, control of the residual aluminum content and the residual titanium content within the above range can be effectively conducted according to the following method [1] or [2].

[1] A method to produce a styrene polymer using a highly active catalyst (see, Japanese Patent Application Laid-Open No. 7466/1988)

That is, a method to polymerize a styrene monomer using a highly active catalyst which comprises (A) a titanium compound represented by the general formula:

TiRXYZ (wherein R is a cyclopentadienyl group, a substituted cyclopentadienyl group or an indenyl group, and X, Y and Z are independently an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom), (B) a contact product of an organic aluminum compound and a condensing agent, and (C) an organic aluminum compound.

The component (A) of the catalyst is, as shown above, a titanium compound represented by the general formula:

TiRXYZ (I)

The substituted cyclopentadienyl group represented by R in the above formula, for example, is a cyclopentadienyl group substituted by at least one alkyl group having 1 to 6 carbon atoms, specifically methylcyclopentadienyl group, 1,2-dimethylcyclopentadienyl group, pentamethylcyclopentadienyl group or the like. In addition, X, Y and Z are independently an alkyl group having 1 to 12 carbon atoms (specifically, methyl, ethyl, propyl, n-butyl, isobutyl, amyl, isoamyl, octyl, 2-ethylhexyl group, etc.), an alkoxy group having 1 to 12 carbon atoms (specifically, methoxy, ethoxy, propoxy, butoxy, amyloxy, hexyloxy, octyloxy, 2-ethylhexyloxy, etc.), an aryl group having 6 to 20 carbon atoms (specifically, phenyl, naphthyl, etc.), an aryloxy group having 6 to 20 carbon atoms (specifically, phenoxy, etc.), an arylalkyl group having 6 to 20 carbon atoms (specifically, benzyl, etc.), or a halogen atom (specifically, chlorine, bromine, iodine or fluorine).

Specific examples of the titanium compound represented by the general formula (I) are cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pantamethylcyclopentadienyltitanium trichloride, cyclopentadienylmethoxytitanium dichloride, cyclopentadienyldimethoxytitanium chloride, pentamethyl-cyclopentadienylmethoxytitanium dichloride, cyclopentadiethyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium and the like.

Among these titanium compounds, a compound containing no halogen atom is preferred. Particularly, the aforementioned 4-coordinated titanium compound wherein at least one ligand is an unsaturated π-electron ligand is preferable.

On the other hand, the component (B) used in combination with the above titanium compound is a condensation product (a contact product) of water and various kinds of organic aluminum. The organic aluminum generally includes organic aluminum compounds represented by the general formula:

$AlR^1_3$ (II)

(wherein $R^1$ is an alkyl group having 1 to 8 carbon atoms), specifically, trimethylaluminum, triethylaluminum, triisobutylaluminum, etc. Among them, trimethylaluminum is most preferable.

Typical example of the condensing agent of condensation with an organic aluminum compound is water. In addition, any compounds which can be condensed with an alkyl aluminum may be used.

A reaction product of an organic aluminum compound such as alkylaluminum with water which is a typical example of the component (B), includes a chain-like alkylaluminoxanes represented by the general formula:

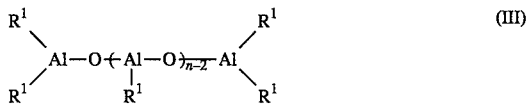
(III)

(wherein n represents an integer of 2 to 50) or cyclic alkylaluminoxanes (degree of polymerization: 2 to 52) having the repeating unit represented by the genera formula:

(III')

In general, the contact product of the organic aluminum compound such as trialkylaluminum and water is a mixture of the aforementioned chain-like alkylaluminoxane, cyclic alkylaluminoxane, unreacted trialkylaluminum and various condensed products, or further a mixture of molecules in which the above components have associated complicatedly, and it becomes various products with the contact conditions of trialkylaluminum and water. In a contact product of the above triallylaluminum (preferably, trimethylaluminum) and water which is suitably used as the component (B) of the catalyst in the present invention, the high magnetic field component in the methyl proton signal region due to the aluminum-methyl group (Al—CH$_3$) bond as observed by the proton nuclear magnetic resonance method is not more than 50%. That is, in a proton nuclear magnetic resonance ($^1$H-NMR) spectral analysis of a solution of the above contact product in toluene at room temperature, the methyl proton signal due to Al—CH$_3$ is observed in the region of 1.0 to –0.5 ppm (tetramethylsilane (TMS) standard). Since the proton signal of TMS (0 ppm) is in the region in which the methyl proton signal due to Al—CH$_3$ is observed, this methyl proton signal due to Al—CH$_3$ is measured based on the methyl proton signal of toluene (2.35 ppm) based on TMS standard, and divided into the high magnetic field component (i.e., −0.1 to −0.5 ppm) and the other magnetic field component (i.e., 1.0 to −0.1 ppm). The contact product in which said high magnetic field component is not more than 50%, preferably 45 to 5% of the whole is preferably used as the component (B) of the catalyst.

The reaction between an organic aluminum compound and water is not particularly limited and is carried out according to any one of the known methods. For example, there are methods such as (1) a method in which an organic aluminum compound is dissolved in an organic solvent and the resulting solution is contacted with water, (2) a method in which an organic aluminum compound is first added to the polymerization system, and then water is added thereto, and (3) a method in which water of crystallization contained in a metal salt or water adsorbed in an inorganic material or an organic material is reacted with an organic aluminum compound.

As the component (C) which constitutes the catalyst, various organic aluminum compounds can be used. The example includes organic aluminum compounds represented by the general formula:

$$R^4{}_k Al(OR^5)_m H_p X^1{}_q \qquad (IV)$$

(wherein $R^4$ and $R^5$ are independently an alkyl group having 1 to 8, preferably 1 to 4 carbon atoms, $X^1$ indicates halogen, k, m, p and q satisfy the following formulas: $0<k\leq3$, $0<m\leq3$, $0\leq p<3$, $0\leq q<3$ and $k+m+p+q=3$).

Examples of the organic aluminum compound represented by the above general formula (IV) will be shown. The compound with $p=q=0$ is represented by the general formula: $R^4{}_k Al(OR^5)_{3-k}$ (wherein $R^4$ and $R^5$ are as defined above, and k is preferably a number satisfying the formula: $1.5 \leq k \leq 3$). The compound with $m=p=0$ is represented by the general formula: $R^4{}_k AlX^1{}_{3-k}$ (wherein $R^4$ and $X^1$ are as defined above, and k is preferably a number satisfying the formula: $0<k<3$). The compound with $m=q=0$ is represented by the general formula: $R^4{}_k AlH_{3-k}$ (wherein $R^4$ is as defined above, and k is preferably a number satisfying the formula: $2 \leq k < 3$). The compound with $p=0$ is represented by the general formula: $R^4{}_k Al(OR^5)_m X^1{}_q$ (wherein $R^4$, $R^5$ and $X^1$ are as defined above, $0<k\leq3$, $0\leq m<3$, $0\leq q<3$ and $k+m+q=3$).

Among the organic aluminum compounds represented by the general formula (IV), the compounds with $p=q=0$ and $k=3$, may be selected from a group consisting of trialkylaluminum such as triethylaluminum, tributylaluminum and a combination thereof. The preferable example includes triethylaluminum, tri-n-butyliminum and triisobutylaluminum. The compound with $p=q=0$ and $1.5 \leq k<3$ includes dialkylaluminum alkoxide such as diethylaluminum ethoxide, dibutylaluminum butoxide, alkylaluminum sesquialkoxide such as ethylaluminum sesquiethoxide, butylaluminum sesquibutoxide, in addition, alkylaluminum having an average composition represented by the formula: $R^4{}_{2.5} Al(OR^5)_{0.5}$ etc., which is partly alkoxylated. The example of the compound with $m=p=0$ includes an alkylaluminum which is partly halogenated, for example, dialkylaluminum halide (k=2) such as diethylaluminum chloride, dibutylaluminum chloride, diethylaluminum bromide; alkylaluminum sesquihalide (k=1.5) such as ethylaluminum sesquichloride, butylaluminum sesquichloride, ethylaluminum sesquibromide; alkylaluminum dihalide (k=1) such as ethylaluminum dichloride, propylaluminum dichloride, butylaluminum dibromide. The example of the compound with $m=q=0$ includes an alkylaluminum which is partly hydrogenated, for example, dialkylaluminum hydride (k=2) such as diethylaluminum hydride, dibutylaluminum hydride; alkylaluminum dihydride (m=k) such as ethylaluminum dihydride, propylaluminum dihydride. The example of the compound with p=0 includes an alkylalumiuum which is partly alkoxylated and halogenated, for example, ethylaluminum ethoxychloride, butylaluminum butoxychloride, ethyliminum ethoxybromide (k=m=q=1).

The catalyst which is preferably used in the present invention contains the above components (A), (B) and (C) as main components. In addition to the above components, other catalyst component can be added, if desired. The ratio of the components (A), (B) and (C) in the catalyst varies with various conditions and thus cannot be determined unconditionally. Usually, the ratio of aluminum contained in the components (B) and (C) to titanium contained in the component (A), i,e., aluminum/titanium (molar ratio) is 1 to $10^4$, preferably, 10 to $10^3$.

The catalyst as described above presents high activity for preparing a styrene polymer having a high degree of syndiotactic configuration.

In the production of a styrene polymer according to this method, styrene monomer such as styrene and/or styrene derivative (alkylstyrene, alkoxystyrene, halogenated styrene, vinyl benzoate, etc.) is polymerized (or copolymerized) in the presence of a catalyst containing the above components (A), (B) and (C) as main components. The polymerization may be bulk polymerization and may be carried out in an aliphatic hydrocarbon solvent such as pentane, hexane, heptane, an cycloaliphatic hydrocarbon solvent such as cyclohexane or an aromatic hydrocarbon solvent such as benzene, toluene, xylene. The polymerization temperature is not particularly limited, but generally, −30° to 120° C., preferably, −10° to 100° C.

In this method, molecular weight of the resulting styrene polymer having a syndiotactic configuration can be readily controlled (1) by controlling the amount of the component (C) to be used, (2) by controlling the polymerization temperature, (3) by controlling the amount of hydrogen gas to be introduced.

Thus obtained styrene polymer having a syndiotactic configuration is deashed and washed, if necessary to give a styrene polymer with less residual aluminum content and residual titanium content.

[2] A method by deashing and washing

This is a method wherein a styrene monomer is polymerized using a conventional organometallic compound of group IVA described in Japanese Patent Application Laid-Open No. 187708/1987 and the like and alkylaluminoxane such as mehtylaluminoxane as the catalyst components, then the resulting styrene polymer having a syndiotactic configuration is deashed with a solution of acid or alkali in a suitable solvent, and washed with a suitable solvent. Examples of such methods include a method which comprises deashing with a solution of sodium hydroxide in methanol followed by washing with methanol, or a method which comprises deashing with a solution of hydrochloric acid in methanol followed by washing with methanol. This method provides a styrene polymer having a high degree of syndiotactic configuration of high purity which can be used in the present invention, even if the residual metal content after polymerization is considerable. If it is not preferable that acid or alkali remains, the above method [1] is preferred.

As mentioned above, a styrene polymer having a syndiotactic configuration with less residual aluminum content and residual titanium content can be obtained by the method [1] or [2]. Further, the product is treated by the following method [3] or [4] to control the residual styrene monomer content below 7,000 ppm.

[3] A method wherein the above styrene polymer is dried under reduced pressure

For drying under reduced pressure, it is efficient to set the drying temperature at the glass transition temperature of the polymer or higher.

[4] A method wherein the above styrene polymer is degassed by an extruder

The above styrene polymer or the styrene polymer dried under reduced pressure by the method [3] is degassed by an extruder and simultaneously formed into a material for molding (pellet). An extruder used in this step is preferably equipped with a vent. Either a uniaxial or biaxial extruder may be used.

Such treatment provides a styrene polymer of high purity which contains less residual aluminum, residual titanium and residual styrene monomer and has a high degree of syndiotactic configuration. If the residual aluminum content exceeds 3,000 ppm or the residual titanium content exceeds 10 ppm, a film with a smooth surface can not be obtained due to agglomeration of the catalyst residue component. If the residual styrene monomer content exceeds 7,000 ppm, the surface of the film after extrusion and stretching may be roughened due to volatiliation of the styrene monomer, and smooth surface cannot be obtained.

The readily slidable film provided by the present invention comprises the aforementioned styrene polymer having a high degree of syndiotactic configuration compounded with fine particles of an inorganic substance. In this case, the inorganic substance means oxide, hydroxide, sulfide, nitride, halide, carbonate, acetate, phosphate, phosphite, organic carboxylate, silicate, titanate or borate of the group IA, IIA, IVA, VIA, VIIA, VIII, IB, IIB, IIIB or IVB element, and hydrate compound thereof, complex compound containing them as a main component, natural mineral particles. For example, there may be mentioned compounds of a group IA element such as lithium fluoride, borax (hydrate salt of sodium borate); compounds of a group IIA element such as magnesium carbonate, magnesium phosphate, magnesium oxide (magnesia), magnesium chloride, magnesium acetate, magnesium fluoride, magnesium titanate, magnesium silicate, hydrate salt of magnesium silicate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate, barium phosphite; compounds of a group IVA element such as titanium dioxide (titania), titanium monooxide, titanium nitride, zirconium dioxide (zirconia), zirconium monooxide; compounds of a group VIA element such as molybdenum dioxide, molybdenum trioxide, molybdenum sulfide; compounds of a group VIIA element such as manganese chloride, manganese acetate; compounds of a group VIII element such as cobalt chloride, cobalt acetate; compounds of a group IB element such as copper iodide; compounds of a group IIB element such as zinc oxide, zinc acetate; compounds of a group IIIB element such as aluminum oxide (alumina), aluminum hydroxide, aluminum fluoride, aluminosilicate (alumina silicate, kaolin, kaolinite); compounds of a group IVB element such as silicon oxide (silica, silica gel), plumbago, carbon, graphite, glass; particulate natural mineral such as carnallite, kainite, isinglass (mica, phlogopite) and pyrolusite.

The average particle diameter of the inorganic substance is 0.01 to 3 μm, preferably, 0.01 to 1 μm. Its content in the composition of the above styrene polymer is 0.001 to 1% by weight, preferably, 0.01 to 0.6% by weight. When the average particle diameter is less than 0.01 μm, it may be difficult to disperse particles because of secondary agglomeration of the particles. When the average particle diameter is more than 3 μm, smoothness may be lost. If the content of the inorganic substance in the composition is less than 0.001% by weight, the effect of improvement of sliding property may not be obtained, and if the content is more than 1% by weight, stretching of thin film may become difficult.

The aforementioned inorganic substance is a component which is indispensable to attain the object of the present invention. But it may contain other fine particles or fine particles with different particle diameter or inorganic filler the like so long as the object of the present invention is not hindered.

The fine particles of inorganic substance is contained in the final molded product (film) and the method for compounding is not limited. For example, it is added or obtained as a deposit in any step during polymerization, or added in any step during melt extrusion.

Particularly, in the present invention, a method wherein the above inorganic substance as slurry is added in any step during polymerization process is preferable to prevent secondary agglomeration of particles.

For effective dispersion of these fine particles, dispersant, surfactant or the like may be used.

Considering moldability, mechanical properties, surface properties and the like, the composition, which is used as a raw material for the film of the present invention, and in principle comprises the above styrene polymer compounded with fine particles of an inorganic substance in a predetermined ratio, may contain other resin component.

For example, styrene polymer having an atactic configuration, styrene polymer having an isotactic configuration, polyphenylene ether, styrene-maleic anhydride copolymer and the like may be readily compatibilized with the above styrene polymer having a syndiotactic configuration and effective to control crystallization when pre-molded product for stretching is prepared, thereby providing a molded product (film) with enhanced stretching properties and excellent mechanical properties, whose stretching conditions may be readily controlled. Among them, when styrene polymer having an atactic and/or isotactic configuration is compounded, it is preferably composed of the same monomers as those of the styrene polymer having a syndiotactic configuration. The content of the compatible resin component is 70 to 1% by weight, preferably, 50 to 2% by weight. When the content of the compatible resin component exceeds 70% by weight, heat resistance, which is an advantage of the styrene polymer having a syndiotactic configuration, may be undesirably spoiled.

The non-compatible resins include a polyolefin such as polyethylene, polypropylene, polybutene, polypentene; a polyester such as polyethylene terephthalate, polybutylene terephthalate, polyethylene naphthalate; a polyamide such as nylon-6, nylon-6,6; a polythioether such as polyphenylene sulfide, a polycarbonate, a polyarylate, a polysulfone, a polyether ether ketone, a polyethersulfone, a polyimide, a halogenated vinyl polymer such as Teflon, an acrylic polymer such as polymethyl methacrylate, a polyvinyl alcohol, and all but the aforementioned compatible resins. There are also cross linked resins containing the aforementioned compatible resins. When the styrene polymer of the present invention having a high degree of syndiotactic configuration contains a small amount of the resin, such resin, which is incompatible with the above styrene polymer, can be dispersed like islands in the styrene polymer having a syndiotactic configuration. Accordingly, it is effective to provide proper gloss and to improve sliding property of the surface after stretching. The content of these non-compatible resin components is 50 to 2% by weight for the purpose of providing gloss, and 0.001 to 5% by weight for the purpose of controlling the surface properties. When the temperature at which the product is used is high, non-compatible resin with considerable heat resistance is preferably used.

In addition, additives such as antioxidant, antistatic agent, colorant, weathering stabilizer or the like may be added so long as the object of the present invention is not hindered.

The readily slidable film provided by the present invention is a stretched film obtained by stretching a composition which comprises the above styrene polymer having a high degree of syndiotactic configuration compounded with fine particles of an inorganic substance and, as needed, other additives. The process for production of such film is not particularly limited. The film may be produced by the process wherein these materials are heat-melted to obtain pre-molded product, then heat-stretched and heat-set.

The operations from heat melting to heat set (annealing) will be explained in detail.

Firstly, a composition which comprises the above styrene polymer having a high degree of syndiotactic configuration compounded with inorganic substance and necessary components as a raw material for molding is usually extruded to give a pre-molded product for stretching (film, sheet or tube). In this molding, the aforementioned heat-melted material for molding is generally molded into a desired form by an extruder. Alternatively, the material for molding may be molded without heat melting while it is softened. An extruder used in this case may be either a uniaxial extruder or a biaxial extruder, with or without vent. A uniaxial tandem type is preferred. An extruder with a suitable mesh may be used.

The extrusion conditions are not particularly limited and properly selected depending on the various circumstances. Preferably, the temperature is selected in the range from melting point to the temperature 50° C. higher than decomposition temperature of the material for molding, and shear stress is not more than $5 \times 10^6$ dyne/cm$^2$. The die used is a T-die, a ring die or the like.

After the above extrusion, the resulting pre-molded product is cooled and solidified. As a refrigerant used in this step, for example, gas, liquid, metal roller and the like may be used. When a metal roller is used, a method using air knife, air chamber, touch roll, electrostatic application and the like is effective to prevent uneven thickness and surge.

The temperature of cooling and solidification is generally from 0° C. to 30° C. higher than glass transition temperature of the pre-molded product for stretching, preferably from 50° C. lower than glass transition temperature to glass transition temperature. The cooling rate is properly selected within the range from 200° to 3° C./sec.

In the present invention, the cooled and solidified pre-molded product is preferably uni- or biaxially stretched. For biaxial stretching, transverse direction (TD) stretching and machine direction (MD) stretching may be simultaneously conducted, or successively conducted in suitable order. Alternatively, stretching may be conducted in one step, or in multiple steps.

Methods for stretching include various methods such as a method using a tenter, a method wherein the product is stretched between rollers, a method by bubbling using a pressure of a gas, a method by rolling and the like. These methods may be applied singly or in combination. The temperature for stretching is generally set between glass transition temperature of the pre-molded product and melting point of the pre-molded product. The stretching rate is generally $1 \times 10$ to $1 \times 10^5$%/min., preferably, $1 \times 10^3$ to $1 \times 10^5$%/min.

It is preferable to further conduct heat setting (annealing) of the stretched film obtained by stretching under the aforementioned conditions when dimensional stability, heat resistance, strength balance of the surface of the film at high temperature are further required. Heat setting may be conducted by the usual method. It can be conducted by maintaining the stretched film in the temperature range from glass transition temperature to melting point of the film, preferably, 100° C. lower than melting point to a little lower than melting point for 0.5 to 120 seconds under a state of tension, a relaxed state or a state of limiting shrinkage. Such heat setting may be conducted twice or more changing the conditions within the above range. The heat setting may be conducted in an atmosphere of an inert gas such as argon gas, nitrogen gas or the like.

Thus obtained stretched film of the present invention has thickness of 0.5 to 500 μm, preferably 1 to 200 μm, surface roughness Ra of 0.005 to 0.03 μm, static friction coefficient μs of 0.3 to 1.0.

When surface roughness Ra is less than 0.005 μm, sliding properties are not sufficient, and when it exceeds 0.03 μm, the product used as a magnetic recording medium may cause abrasion of a magnetic head. When static friction coefficient is less than 0.3, sliding properties are good, but may cause deviation from the proper winding position, and when it exceeds 1.0, the product can not be practically used because of insufficient sliding properties.

The readily slidable film provided by the present invention is a film which is obtained by laminating a layer comprising a composition of the above styrene polymer having a high degree of syndiotactic configuration compounded with fine particles of an inorganic substance (hereinafter referred to as layer B) on the one side of a layer containing, as a main ingredient, a styrene polymer of high purity having a high degree of syndiotactic configuration wherein the above residual aluminum content is not more than 3,000 ppm, the residual titanium content is not more than 10 ppm and the residual styrene monomer content is not more than 7,000 ppm (hereinafter referred to as layer A). The layer A containing a styrene polymer of high purity having a high degree of syndiotactic configuration may optionally contain an antioxidant, antistatic agent, flame retardant, inorganic filler or other resin (atactic polystyrene, isotactic polystyrene, polyphenylene ether, styrene-maleic anhydride copolymer, etc.) so long as the object of the present invention is not hindered. The layer B is that comprising a composition which contains the above styrene polymer having a high degree of syndiotactic configuration compounded with fine particles of an inorganic substance.

The readily slidable film provided by the present invention is a film prepared by laminating a resin layer containing inorganic particles (hereinafter referred to as layer C) on the one side of the layer containing, as a main ingredient, a styrene polymer of high purity having a high degree of syndiotactic configuration and the above residual aluminum content of not more than 3,000 ppm, the residual titanium content of not more than 10 ppm and the residual styrene monomer content of not more than 7,000 ppm (hereinafter referred to as layer A).

As mentioned above, the layer A which contains a styrene polymer of high purity having a high degree of syndiotactic configuration may optionally contain an antioxidant, antistatic agent, flame retardant, inorganic filler or other resin (atactic polystyrene, isotactic polystyrene, polyphenylene ether, styrene-maleic anhydride copolymer, etc.) as needed so long as the object of the present invention is not hindered. As the resin of the layer C, various kinds of resins including the above styrene polymer or the above blend resin (the other resin) may be used. Among them, resins with high melting point or softening point are preferred. Inorganic particles contained in the layer are those mentioned above, and particle diameter is not particularly limited, but generally, inorganic particles have an average particle diameter of 0.01 to 3 μm, preferably 0.01 to 1 μm. The compounding ratio is not particularly limited, but generally 0.001 to 1% by weight, preferably 0.001 to 0.8% by weight. If the average particle diameter of the above inorganic particles is less than 0.01 μm, it may be difficult to disperse the particles because of secondary agglomeration of the particles. If the average particle diameter is more than 3 μm, sliding properties may be lost. If the content of the inorganic particles in the composition is less than 0.001% by weight, the effect of improvement of sliding properties may not be obtained, and if the content is more than 1% by weight, stretching of thin film may become difficult.

The resin layer C of the present invention may contain other fine particles or fine particles with different particle diameter or inorganic filler or the like so long as the object of the present invention is not hindered.

The inorganic particles are contained in the final molded product (film) and the method for compounding is not limited. For example, it is added or obtained as a deposit in any step during polymerization, or added in any step during melt extrusion. Particularly, a method wherein the above inorganic particles are added as slurry in any step during polymerization process is preferable to prevent secondary agglomeration of the particles.

For effective dispersion of these particles, dispersant, surfactant or the like may be added.

Considering moldability, mechanical properties, surface properties and the like, the above layer C which is obtained basically by compounding inorganic particles in the above styrene polymer in a specific ratio may contain other resin component.

The methods for production of a readily slidable film wherein the above layers A and B are laminated or the above layers A and C are laminated include a method wherein components of each layer are coextruded while heat-melted, then after cooling and solidification, stretched, and heat-treated (anealing) as needed, or a method wherein a composition of the layer B or C is dissolved or melted and coated on the one side of the layer A. The operations from heat melting to heat treatment (annealing) will be explained in detail.

Firstly, the material for molding of the above layers A and B or material for molding of the layers A and C are generally coextruded to prepare a pre-molded product for stretching (raw sheet). In this molding, the above heat-melted material for molding is generally molded into a desired shape, but the softened material for molding may be molded without heat-melting. An extruder used in this process may be either a uniaxial extruder or a biaxial extruder, with or without a vent. A uniaxial tandem type is preferred. A suitable mesh may be used in an extruder.

The extrusion conditions are not particularly limited and properly selected depending on the various circumstances. Preferably, the temperature is selected in the range from melting point to 50° C. higher than decomposition temperature of the material for molding. The shear stress is not more than $5 \times 10^6$ dyne/cm². The die used is a T-die, a ring die or the like.

After the above coextrusion, the resulting raw sheet is cooled and solidified. As a refrigerant used in this step, various ones, for example, gas, liquid, metal roller and the like may be uesd. When a metal roller is used, air knife, air chamber, touch roll, electrostatic application and the like may be effectively used to prevent uneven thickness and surge.

The temperature of cooling and solidification is generally from 0° C. to 30° C. higher than glass transition temperature of the raw sheet, preferably from 20° C. lower than glass transition temperature to glass transition temperature. The cooling rate is properly selected within the range from 200° to 3° C./sec.

In the present invention, the cooled and solidified pre-molded product (raw sheet) is uni- or biaxially stretched. For biaxial stretching, machine direction (MD) stretching and transverse direction (TD) stretching may be simultaneously conducted, or successively conducted in suitable order. Stretching may be conducted in one step, or in multiple steps.

There are various methods for stretching, for example, a method using a tenter, a method wherein the product is stretched between rollers, a method by bubbling using a pressure of a gas, a method by rolling. These methods may be applied singly or in a combination. The temperature for stretching is generally set between glass transition temperature and melting point of the raw sheet. The stretching rate is generally $1 \times 10$ to $1 \times 10^5$%/min., preferably, $1 \times 10^3$ to $1 \times 10^5$%/min.

It is preferable to conduct heat setting of the stretched film obtained by stretching under the aforementioned conditions when dimensional stability, heat resistance, strength balance of the surface of the film at high temperature are required. Heat setting may be conducted by the usual method. It can be conducted by maintaining the stretched film in the temperature range from glass temperature to melting point of the film, preferably, 100° C. lower than melting point to slightly lower than melting point, for 0.5 to 120 seconds under a state of tension, a relaxed state or a state of limiting shrinkage. Such heat setting may be conducted at least twice changing the conditions within the above range. The heat setting may be conducted in an atmosphere of an inert gas such as argon gas, nitrogen gas or the like. Without such heat setting, deformation particularly around glass transition temperature may often occur, resulting in limitation upon processing or usage.

In a method for lamination by coating, the film of the layer A is molded, then a composition of the layer B or C is dissolved or melted, coated and dried.

For molding of the film of the layer A, operations of heat-melting, stretching and heat-setting may be carried out in the same manner as mentioned above using the above composition.

Surface roughness Ra of thus prepared layer A is generally not more than 0.02 μm. A composition of the layer B or C is dissolved in a solvent in which said composition can be dissolved, or melted at melting temperature or higher, and evenly coated on either surface of the film of the layer A to the objective thickness using a bar coater the like. Then, the resultant was dried to give a readily slidable film.

Thus obtained readily slidable film of the present invention is 2 to 500μ thick. One side is rough and the other side is smooth. In principle, the layer A is smooth and the layer B or C is rough. Surface roughness of said smooth surface is 0.001 to 0.02 μm, preferably, 0.003 to 0.018 μm. Surface roughness Ra of the rough surface is not particularly limited, but generally, 0.005 to 0.05 μm is preferred. The ratio of surface roughness of the rough surface to that of the smooth surface (i.e., surface roughness of the rough surface/surface roughness of the smooth surface) is controlled to 1.5 to 10, preferably 1.8 to 8. Static friction coefficient Us of this film is 0.3 to 1.0. preferably, 0.3 to 0.8. Static friction coefficient means friction coefficient between rough surface and smooth surface.

Particularly, a film of 2 to 20 μm thick is preferred for a magnetic tape or condenser, and a film of 20 to 150 μm thick is preferred for a magnetic card, base material for printed board, photographic film.

As mentioned above, the readily slidable film of the present invention is a film excellent in heat resistance, mechanical strength, sliding properties, smoothness and the like and is produced by the above methods. Particularly, the objective film may be produced by the following method in good efficiency.

In the present invention, a monolayer or laminate pre-molded product for stretching (raw sheet, film, etc.) using the above styrene polymer having a high degree of syndiotactic configuration or a composition of said polymer compounded with other ingradients is used as a starting material, and the objective film is produced basically via two-stage stretching step of said pre-molded product. The production of the pre-molded product for stretching is as follows. For production of a monolayer film, the above material is extruded into a monolayer film (raw sheet). For production of the film wherein the layers A and B are laminated or the layers A and C are laminated, materials are coextruded and formed into a laminated film (raw sheet) to obtain pre-molded product for stretching (film, sheet or tube). In such molding, the above heat-melted material for molding is generally molded into desired form by an extruder. Alternatively, the softened material for molding may be molded without heat-melting. An extruder used in this process may be either a uniaxial extruder or a biaxial extruder, with or without a vent. A uniaxial tandem type is preferred. Using an extruder with a suitable mesh, impurities and contaminants can be removed. Particularly, for production of stretched film having a smooth surface, the mesh used is preferably at least 100 mesh, most preferably, at least 400 mesh. When such mesh is used, mesh with gauge lower than the above may be placed before or behind the above mesh, considering pressure resistance or strength of the mesh itself. As for shape of the mesh, for example, plane, cylindrical mesh may be properly selected and used.

The extrusion conditions are not particularly limited and properly selected depending on the various circumstances. Preferably, the temperature is selected in the range from melting point to 50° C. higher than decomposition temperature of the material for molding (decomposition temperature +50° C.). Melting is impossible at a temperature lower than melting point, and remarkable decomposition occurs at a temperature over decomposition temperature +50° C., resulting in undesirable phenomena such as deterioration, foaming in an extruder. The die used is a T-die, a ring die or the like.

Decomposition temperature used herein means the temperature at which 1% of decrease in weight as measured by thermogravimetry (TG) may occur. For example, in a homopolymer of styrene having a syndiotactic configuration, glass transition temperature (Tg) is preferably 90° to 100° C., melting point (Tm) is 260° to 275° C. and decomposition temperature (Td) is 320° C. Accordingly, melting temperature is preferably 270° C. to 350° C.

After the above extrusion, the resulting pre-molded product for stretching is cooled and solidified. As a refrigerant used in this step, various ones, for example, gas, roller is used, air knife, air chamber, touch roll, electrostatic application and the like may be effectively used to prevent uneven thickness and surge.

The temperature for cooling and solidification is generally within the range from 0° C. to 30° C. higher than glass transition temperature of the pre-molded product for stretching (Tg+30° C.), preferably within the range from 20° C. to glass transition temperature (Tg+20° C.). If it is lower than 0° C., cooling rate may be faster than it is needed and stiffness of the sheet may increase instantaneously, resulting in surge of the molten material during solidification, that is, steady molding is impossible. Further, at 30° C. higher than glass transition temperature, crystallinity of the solidified molded product increases, causing deterioration of stretchability. For example, a styrene polymer having a syndiotactic configuration is cooled and solidified at 0° to 130° C., preferably at 20° to 90° C. Generally, cooling rate of not less than 3° C./sec. and not more than 200° C./sec. is preferred. As for cooling conditions, the product may be preferably molded so as to provide relatively less orientation.

In the properties of thus obtained molded product, those having density of not more than 1.07 g/cm$^3$ and crystallinity of about 5° to 30°% are preferable, providing good continuous productivity.

Subsequently, the cooled and solidified pre-molded product for stretching is stretched in two-stage process.

Firstly, stretching in MD or simultaneous, biaxial stretching in MD and TD is carried out as stretching in the first stage. When stretching in the first stage is carried out in MD, i.e., in the direction of flow of the continuous film-forming line, the sheet-like molded product is preferably stretched with heating. Temperature for stretching is not particularly limited, but it is in the range from glass transition temperature of said sheet-like molded product to cooling crystallization temperature. If the stretching temperature is lower than glass transition temperature, insufficient softening results in difficulty in stretching, and if over cooling crystallization temperature, it may be difficult to carry out even stretching due to progress of crystallization.

Such stretching in MD may be carried out by the conventional method. Particularly, uniaxial stretching between rolls is a general method and provides the highest productivity among the methods for stretching in MD. According to this method, running film while held between at least two pairs of nip rolls and guide roll is heated in the step before passing through the nip roll or by the roll itself, and can be stretched in MD utilizing deference of circumferential speed of the two pairs of nip rolls. Magnification of stretching is not particularly limited, and generally is 1.2 to 5. When magnification is less than 1.2, effect of stretching can not be obtained and when it is more than 5, stretching in TD may be difficult.

More preferably, the film is stretched in such a way that the absolute value of birefringence (|Δn|) of the stretched film satisfies the following formula:

$$3 \times 10^{-3} \leq |\Delta n| \leq 70 \times 10^{-3}$$

If |Δn| is less than $3 \times 10^{-3}$, the objective effect of stretching is insufficient, and if |Δn| exceeds $70 \times 10^{-3}$, stretching in the following stage may often become unstable. To bring the absolute value of birefringence within the range, the aforementioned conditions such as stretching temperature, magnification and the like may be properly selected.

The absolute value of birefringence |Δn| is difference between refractive index in MD, $n_{MD}$ and that in TD, $n_{TD}$, and obtained by measurement of intensity with Berek compensator connected to polarization microscope or with laser by a combination of polarizers, or by directly measuring $n_{MD}$ and $n_{TD}$ with Abbe refractometer.

The step, wherein stretching in MD and TD is carried out by simultaneous, biaxial stretching process, will be explained. In this step, the aforementioned sheet-like molded product is heated and stretched simultaneously in MD and in TD by various methods. The stretching machine is not particularly limited and includes a tenter, tubular, roll and the like so long as it enables simultaneous stretching in MD and TD. Stretching temperature is not particularly limited, but stretching is generally carried out in the range from glass transition temperature to cooling crystallization temperature. Softening is insufficient at the temperature lower than glass transition temperature, resulting in difficulty in stretching, and stretching is inhibited by crystallization at the temperature over cooling crystallization temperature, thus stretching can not be carried out.

Stretch ratio is not particularly limited, but generally 1.2 to 5 both in MD and TD. Stretch ratio in MD may be different from that in TD. Total area magnification, i.e. product of stretching magnification in MD and that in TD is preferably 2 to 25. If the total area magnification is less than 2, sufficient effect of stretching is not obtained, and if it exceeds 25, stretching and molding in the following step may be difficult.

In the present invention, thus obtained sheet is uniaxially stretched in TD or simultaneously, biaxially stretched in MD and in TD during the second stage. Such restretching step may evenly and remarkably improve mechanical strength of the film.

Firstly, in uniaxial stretching in TD, the stretched film obtained in the first stage is stretched in TD, i.e., in the direction which makes an angle of 90° C. to the direction of flow of the film-forming line. Stretching is not particularly limited and may be carried out by various methods including the conventional methods. Particularly, tenter-stretching in TD is popular, wherein both sides of the running film are held with continuously running clips or the like, and the film is carried into a proper temperature atmosphere while it is held at its both sides, and distance between both clips is changed by changing tracks of the rails on which the clips run to stretch the film in TD. Stretching temperature may be properly selected. Generally, it is at least 5° C. higher than glass transition temperature (Tg+5° C.) and not higher than the temperature 30° C. lower than melting point (Tm–30° C.). If stretching temperature is lower than (Tg+5° C.), insufficient softening may sometimes result in difficulty in stretching, and if it exceeds (Tm–30° C.), the film may be partly melted, resulting in breakage or the like, and further in difficulty in stretching.

In stretching in TD according to the method of the present invention, stretch ratio is not particularly limited and properly selected according to the circumstances, but generally it is in the range from 1.2 to 5. At the stretch ratio below 1.2, mechanical strength in TD may become insufficient, and the ratio more than 5 may provide excessive stretching, often causing breaking during stretching.

When simultaneous, biaxial stretching is carried out in the second stage, the stretching apparatus used is not particularly limited so long as it can stretch the film both in MD and in TD simultaneously. For example, the apparatus which pinches both sides of the film and stretches said film both in MD and TD simultaneously by simultaneously extending distance between clips at both sides and that between adjacent clips may be used. It is preferable to carry out simultaneous, biaxial stretching so as to bring the absolute value of birefringence |Δn| of the film after simultaneous, biaxial stretching to below $40 \times 10^{-3}$. If the absolute value of birefringence |Δn| of the film after simultaneous biaxial stretching exceeds $40 \times 10^{-3}$, balance of strength in MD and TD may be disturbed. Accordingly, stretching is carried out at a stretching temperature in the range from glass transition temperature (second-order transition point) to melting point, preferably 10° C. lower than stretching temperature in the first stage to 40° C. lower than melting point at stretch ratio (both in MD and TD) of 1.2 to 5, preferably 1.2 to 3.5. Stretch ratio in MD and that in TD may be the same or different. If stretch ratio is less than 1.2 ,film with great strength can not be obtained, and if it exceeds 5, the film may often break during stretching and it is difficult to conduct stable molding.

Total area magnification of the film after simultaneous, biaxial stretching in the second stage is at least 10, preferably at least 11. If it is less than 10, the film is not sufficiently stretched in both directions and sufficient strength may not be obtained.

As a process for production of readily slidable film, the present invention provides a process wherein the film obtained in the aforementioned process is further stretched in MD. Such restretching remarkably improves mechanical strength of the film in MD.

Such stretching in MD is not particularly limited so long as it is carried out according to the conventional methods. The most general method with the highest productivity is the aforementioned uniaxial stretching between rolls. Alternatively, a method wherein the distance between clips is slowly extended in the direction of running using a tenter which fixes the both sides of the running film with clips. Stretching temperature in MD stretching is not particularly limited, but generally, it is from 5° C. higher than glass transition temperature (Tg+5° C.) to 30° C. lower than melting point (Tm–30° C.). If stretching temperature is lower than (Tg+5° C.), insufficient softening may sometime result in difficulty in stretching, and if it exceeds (Tm– 30° C.), the film which partly melts may, for example, be broken, thus stretching becomes difficult. Stretch ratio is not particularly limited, but generally it may be selected within the range from 1.2 to 3.5. If it is less than 1.2, the objective effect of orientation in MD is not sufficiently obtained, and if it exceeds 3.5, the film may be readily broken during stretching.

In the film after re-stretching which is obtained by the preceding stretching step comprising stretching in MD in the first stage followed by stretching in TD in the second stage, total stretch ratio in MD is preferably at least 2.5 and not more than 12, and total area magnification is at least 6. Total stretch ratio is a product of stretch ratio in MD and restretch ratio in MD. Total area magnification is a product of stretch ratios in all directions. If total stretch ratio in MD is less than 2.5, sufficient mechanical strength in MD is not obtained, and if it is more than 12, the film is excessively oriented in MD and disadvantageously be readily torn. If total area magnification is less than 6, the properties of the resulting film are resemble to those of uniaxially stretched film, providing deterioration of mechanical strength and tearability.

Further, the present invention provides, as a process for production of the aforementioned readily slidable film, a process wherein the above premolded product is simultaneously, biaxially stretched in MD and TD, subsequently stretched in MD. Simultaneous, biaxial stretching may be carried out in the same manner as mentioned above. Stretching in MD may be carried out in the same manner as described above, but it is preferable to make stretching ratio in MD in the renge from 2.5 to 12 from the aforementioned reason.

As mentioned above, the stretched film obtained according to the present invention can be directly used as a readily slidable film, but preferably is subject to heat treatment to improve heat resistance and to prevent deformation upon heat. Such heat treatment is generally carried out while the film is kept in the state of tension. Unless the film is in the state of tension, the film may be shrunk and tend to become uneven. The heat treatment temperature is lower than melting point of the film after stretching, preferably selected within the range between melting point and 100° C. or more and melting point and 5° C. or lower. The most suitable temperature condition should be determined depending on the speed of the film passing through the oven, i.e., treatment time. The treatment time may be determined according to various conditions, but generally not more than 3 minutes for plant capacity and labor saving. Too long heat treatment time often causes breakage of the film during molding. If necessary, heat treatment (e.g., aging) after winding may be carried out separately from the continuous line.

According to the process of the present invention, the objective film of the styrene polymer can be produced by continuously conducting such operations.

The process for producing a film provided by the present invention includes a process wherein the premolded product of the aforementioned styrene polymer having a syndiotactic configuration or a composition thereof is molded, cooled (particularly, quenched), then rolled to bring decrease in thickness within the range from 1 to 30%. As an extruder and T-die or press molding apparatus used in this step, those generally used may be directly used. In the molding, the product is preferably quenched to the temperature lower than glass transition temperature immediately after molding. The process for production of the premolded product may be carried out in the same manner as described above. In the styrene polymer having a high degree of syndiotactic configuration, crystallinity is not more than 30%, preferably not more than 20%, still more preferably not more than 10%. Unevenness in thickness of the premolded product is desirably not more than ±10%, particularly not more than ±5%.

For rolling, it is preferable to conduct preheating to decrease pressure to be added. Such preheating should be conducted at the temperature lower than that for rolling, within the time so as not to enhance crystallinity. Temperature for rolling is preferably not lower than glass transition temperature (Tg) of the resin and 10° C. lower than melting point (Tm) of the resin, i.e., (Tg to (Tm−10° C.)). If rolling temperature is lower than Tg, the molding may be broken, and if it exceeds (Tm −10° C.), the sufficient effect of rolling may not be obtained.

According to the process of the present invention, the premolded product is rolled to bring decrease in thickness within the range from 1 to 30%, preferably from 5 to 25%. Rolling within such range enables usage of a cheap rolling machine and also enhances stiffness of the rolled product. Further, moldability of the resulting rolled product, i.e., film, sheet or the like is good, with less drawdown during heat forming. If decrease in thickness is less than 1%, effect of rolling is little, and good molding may not be obtained because of increased drawdown during heat forming or generation of bridge. If decrease in thickness exceeds 30%, great pressure should be necessary, resulting in greatly enhanced cost of apparatus, that is, it is not suitable for industrial production.

As rolling machines, various kinds of the conventionally used ones can be used.

The readily slidable film of the present invention can be produced by the aforementioned processes.

In the present invention, restretching, regardless of direction and number of steps, may be carried out, if necessary, after completion of stretching. After completion of stretching, rolling or heat treatment, coating, lamination or vapor deposition may be conducted. Further, plasma treatment, corona treatment, flame treatment or the like may be conducted for surface treatment.

The film thus produced satisfies the aforementioned surface roughness, the ratio of surface roughness and static friction coefficient, and is a film excellent in heat resistance and mechanical strength.

The well-balanced film excellent in mechanical strength is that having F-5 value in MD and TD as measured by tensile test of the film according to JIS C-2318 of at least 9 kg/mm$^2$ and the ratio thereof is within the range from 0.75 to 1.25. If the F-5 value is less than 9 kg/mm$^2$, the product may not be used as a magnetic recording medium or the like. If the ratio of the F-5 value (MD/TD ratio) is outside of the above range, dimensional stability is insufficient.

Further, the present invention provides a process wherein chemical and/or physical treatment is conducted partially or totally on the film particularly after the above step to improve surface tension, wherein the surface tension of the treated portion is at least 35 dyne/cm.

The chemical and physical surface treatment is carried out by various methods without particular limitation, so long as it brings surface tension of the film after treatment to 35 dyne/cm or more. Particularly, the following methods can be employed.

Firstly, chemical treatment includes wet treatment, for example, (1) treatment with chemicals wherein the film is dipped in various chemicals to form porous structure on the surface by introducing the objective functional group (carbonyl group in the present invention), or by etching, (2) treatment with a coupling agent wherein the film is dipped in a silyl peroxide solution Containing a silane, titanium or chrominum coupling agent to form a surface layer, (3) monomer, polymer coating treatment wherein optional monomer or polymer is coated on the surface of the film, (4) steam treatment wherein the film is exposed to steam of various kinds of compounds and the components of said steam are introduced to the surface treated portion by surface etching with the steam or by reaction of the components of said steam and the surface of the film, (5) surface grafting treatment which comprises graft polymerization of the film with compounds having oxygen-containing functional group, (6) electrochemical treatment wherein the film is dipped in an electrolyte to reduce the surface of said film and the like.

When such chemical treatment is conducted, organic solvent having solubility parameter of 7 to 12 (cal/cm$^3$)$^{1/2}$, inorganic (aqueous) solution which can be used for atactic polystyrene, gas and the like may be preferably used because the styrene polymer used in the present invention is excellent in solvent resistance.

Physical treatment which is essentially dry treatment includes, for example, (1) UV irradiation treatment wherein ultraviolet is applied to the surface of the film to form carbonyl group on the surface, (2) plasma treatment wherein carbonyl group is formed on the surface of the molding by blow discharge or corona discharge, (3) plasma polymerization treatment wherein polymerized membrane is formed on the surface of the film in a carrier gas of plasma state, (4)

ion beam treatment wherein ion is accelerated and hit on the surface of the film to roughen the surface, (5) mechanical treatment wherein surface is activated or roughened by mechanochemical effect, (6) flame treatment wherein surface is oxidized by applying oxidizing flame, (7) ozone treatment wherein ozone at high concentration is blown between films just before lamination and the like.

Because the styrene polymer of the present invention is excellent in heat resistance, such physical treatment can be efficiently conducted at relatively high temperature, for example, at the temperature higher than glass transition temperature, at which the conventional atactic polystyrene can not be treated.

Accordingly, surface treatment can be conducted effectively in shorter period of time compared with the conventional treatment. And the surface of the resulting film is treated widely, evenly and sufficiently. Evenness of surface treatment is extremely important factor in the subsequent processing (printing, lamination, etc.).

Among the aforementioned methods, UV irradiation treatment, plasma treatment, flame treatment, ozone treatment and the like are particularly preferred.

In the present invention, one or two or more of the aforementioned treatments are combined, or methods other than the above ones may be applied on the surface of the film to provide a film having surface tension of at least 35 dyne/cm, preferably at least 37 dyne/cm. If surface tension of the film is less than 35 dyne/cm, wettability of the surface is poor, disadvantageously resulting in insufficient spread of printing ink or deterioration of adhesiveness.

Surface tension in the present invention is measured at 23° C., 50%RH (relative humidity) using surface wetting agent according to JIS K 6810.

Thus obtained film of the present invention maintains the aforementioned properties and further has improved surface tension. The film is used singly or in lamination with other resins or the like in various usage.

The present invention is described in greater detail with reference to examples and comparative examples.

Reference Example 1

(1) Preparation of a contact product of trimethylaluminum and water

In a 500-milliliter glass vessel in which air had been replaced with argon, 17.8 g (71 mmol) of copper sulfate pentahydrate ($CuSO_4 \cdot 5H_2O$), 200 ml of toluene and 24 ml (250 mmol) of trimethylaluminum were placed and reacted at 40° C. for 8 hours. And then, from the solution obtained by removing the solid, toluene was further distilled away under reduced pressure at room temperature to obtain 6.7 g of a contact product. The molecular weight of the product as determined by the freezing point depression method was 610. The aforementioned high magnetic component (i.e., −0.1 to −0.5 ppm) as observed by $^1$H-NMR was 43%.

(2) Production of a styrene polymer 0.5 Parts by weight of dry method silica (Aerogil TT-600 (diameter of primary particle, 40 μm), manufactured by Degussa Co.) was added to 99.5 parts by weight of pure styrene monomer, and the resultant was mixed and stirred in a cylindrical container using T. K. Homomixer type L (manufactured by Tokushukika Kogyo) to prepare a styrene mixture. In this step, 0.1 parts by weight of calcium stearate was added.

Subsequently, in a 2-liter reactor, 5 mmol of the contact product obtained by the above method (1) as aluminum atom, 5 mmol of triisobutyl aluminum, 0.025 mmol of pentamethylcyclopentadienyltitanium trimethoxide and 1 L (L=liter) of the above styrene mixture were added and polymerized at 90° C. for 5 hours. Then, methanol was poured to cease polymerization and the resultant was dried to give 300 g of the polymer. Subsequently, this polymer was extracted with methyl ethyl ketone using a Soxhlet extractor to give 98.0% of extraction residue (MIP). Weight average molecular weight of the resulting polymer was 390,000, and the value of weight average molecular weight/number average molecular weight was 2.6. Melt viscosity (300° C.; shear rate, 200/sec) was $2 \times 10^4$ poise. The melting point and $^{13}$C-NMR measurements confirmed that the resulting polymer was polystyrene having a syndiotactic configuration.

The polymer was dissolved in 1,2,4-trichlorobenzene at 130° C., and the silica content in the polymer was determined. This solution was dropped onto a slide glass, and observed by a microscope. As the result, silica content was 0.5% by weight and an average particle diameter of silica was 0.08 μm.

Reference Example 2

(1) Preparation of contact product of trimethylaluminum and water

The procedure in Reference Example 1 (1) was repeated to obtain a contact product.

(2) Production of a styrene polymer composition containing inorganic particles 0.5 Parts by weight of dry method silica (Aerogil TT-972 (diameter of primary particle, 0.3 μm), manufactured by Nippon Aerogil) was added to 99.5 parts by weight of pure styrene monomer, and the resultant was mixed and stirred in a cylindrical container using T. K. Homomixer type L (manufactured by Tokushukika Kogyo) to prepare a styrene mixture. In this step, 0.2 parts by weight of calcium stearate was added.

Subsequently, in a 2-liter reactor, 5 mmol of the contact product obtained by the above method (1) as aluminum atom, 5 mmol of triisobutyl aluminum, 0.025 mmol of pentamethylcyclopentadienyltitanium trimethoxide and 1 L (L=liter) of the above styrene mixture were added and polymerized at 90° C. for 5 hours. Then, a solution of sodium hydroxide in methanol was poured to decompose the catalyst component and to cease polymerization and the resultant was further washed repeatedly with methanol and dried to give 300 g of the polymer.

Weight average molecular weight of the resulting polymer measured by gel permeation chromatography at 135° C. using 1,2,4-trichlorobenzene as a solvent was 389,000, and the value of weight average molecular weight/number average molecular weight was 2.64. The melting point and $^{13}$C-NMR measurements confirmed that the resulting polymer was polystyrene having a syndiotactic configuration. Melt viscosity (300° C.; shear rate, 200/sec) was $1 \times 10^4$ poise.

The polymer was dissolved in 1,2,4-trichlorobenzene at 130° C., then filtered and the silica content in the polymer was determined to be 0.5 wt %. This solution was dropped onto a slide glass, and observed by a microscope. As the result, an average particle diameter of silica was 0.08 μm.

Further, the styrene polymer was dried under reduced pressure at 150° C. for 2 hours. The resulting powder was extruded by a vented biaxial extruder equipped with capillaries at the tip thereof at 300° C., then cooled and cut to prepare pellets. The pellets were crystallized in a hot air with stirring. The pellet had crystallinity of 35% and contained 700 ppm of styrene monomer.

Reference Example 3

(1) Preparation of a contact product of trimethylaluminum and water

The procedure in Reference Example 1 (1) was repeated to obtain a contact product.

(2) Production of a styrene polymer composition without containing inorganic particles The procedure in the above Reference Example 2 (2) was repeated using a styrene monomer without containing dry method silica to prepare a styrene polymer. In the resulting polymer, weight average molecular weight was 417,000, the value of weight average molecular weight/number average molecular weight was 2.54, Al content was 75 ppm and Ti content was 2 ppm. Melt viscosity (300° C.; shear rate, 200 /sec) of the polymer was $1.2 \times 10^4$ poise.

The polymer was pelletized in the same manner as that in the above Reference Example 2 (2). The pellet had crystallinity of 30% and contained 800 ppm of styrene monomer.

Reference Example 4

(1) Preparation of a contact product of trimethylaluminum and water

The procedure in Reference Example 1 (1) was repeated to obtain a contact product.

(2) Production of a styrene polymer

In a 2-liter reactor, 5 mmol of the contact product obtained by the above method (1) as aluminum atom, 5 mmol of triisobutyl aluminum, 0.025 mmol of pentamethylcyclopentadienyltitanium trimethoxide and 1 L (L=liter) of pure styrene were added and polymerized at 90° C. for 5 hours. Then, a solution of sodium hydroxide in methanol was poured to decompose the catalyst component and the resultant was washed repeatedly with methanol and dried to give 300 g of the polymer (polystyrene).

The resulting polymer was determined by gel permeation chromatography at 135° C. using 1,2,4-trichlorobenzene as a solvent. As the result, weight average molecular weight of this polymer was 389,000, and the value of weight average molecular weight/number average molecular weight was 2.64. The melting point and $^{13}$C-NMR measurements confirmed that syndiotacticity of the resulting polymer as racemic pentad was 92%, glass transition temperature (Tg) was 97° C., melting point (Tm) was 272° C. and decomposition temperature (Td) was 320° C.

Melt viscosity of this polymer (300° C.; shear rate, 200 /sec) was $3 \times 10^4$ poise.

Reference Example 5

0.4 parts of dry method silica (Aerogil TT-600 (diameter of primary particle, 40 μm) manufactured by Degussa Co.) was added to 100 parts by weight of pure styrene monomer, and the resultant was mixed in a cylindrical container using a T. K. homomixer type L (manufactured by Tokushukika Kogyo) to prepare a styrene mixture. In this step, 0.05 parts by weight of calcium stearate was added.

The operation in Reference Example 4 was repeated, except that this styrene in which inorganic particles were dispersed was used.

Weight average molecular weight of this polymer was 388,000, and the value of weight average molecular weight/number average molecular weight was 2.70. The melting point and $^{13}$C-NMR measurements confirmed that the resulting polymer was a polystyrene having a syndiotactic configuration.

Silica content in this polymer was 0.4% by weight and melt viscosity (300° C.; shear rate, 200/sec) was $2 \times 10^4$ poise.

Reference Example 6

(Production of styrene polymer)

In a reactor, 2 L of toluene as a solvent, as catalyst components, 5 mmol of tetraethoxytitanium and 500 mmol of methylaluminoxane as an aluminum atom were added, to which was added 15 L styrene at 50° C., and polymerization reaction was carried out for 4 hours.

After completion of the reaction, the product was washed with a mixture of hydrochloric acid/methanol to decompose and remove the catalyst component. Subsequently, the resultant was dried to give 2.5 kg of styrene polymer (polystyrene). Then, this polymer was subject to Soxhlet extraction with methyl ethyl ketone as a solvent to give 95% by weight of extraction residue. Weight average molecular weight of the resulting polymer was 800,000. From analysis by $^{13}$C-NMR measurement using 1,2-dichlorobenzene as a solvent, absorption derived from syndiotactic configuration was observed at 143.55 ppm. Syndiotacticity as racemic pentad was 96% calculated from the peak area. To thus obtained polystyrene were added, as antioxidant, bis(2,4-di-butylphenyl)pentaerythritol diphosphite and tetrakis [methylene(3,5-di-butylhydroxyhydrocinnamate)] -methane (0.1 parts by weight, each), and the resultant was pelletized by extruding using a biaxial extruder (diameter, 40 mm).

Melting point (Tm) and glass transition temperature (Tg) of the resulting styrene polymer (SPS) were 270° C. and 100° C., respectively.

Example 1

Powdery styrene polymer obtained in Reference Example 1 was dried under reduced pressure at 150° C. while stirring. After this dry powder was heated and melted at 300° C., the resultant was extruded by a biaxial extruder and cut into pellet.

This pellet was heat-melted and extruder at 330° C. using a serial tandem type uniaxial equipped with a T-die at the tip thereof. In this step, shear stress was $3 \times 10^5$ dyne/cm$^2$. This melt-extruded sheet was contacted and cooled on metal cooling rollers by electrostatic application to prepare a raw sheet for stretching. Temperature of the metal cooling roller was 70° C. and cooling rate was 45° C./sec. Thickness of the prepared raw sheet was 110 μm and crystallinity was 14%. The raw sheet was sequentially stretched in machine direction (MD) (×3, 110° C., 3,000%/min.) and in transverse direction (×3, 120° C., 3,000%/min.) by a tenter.

Then, this film was heat-treated at 255° C. for 30 seconds under state of controlling shrinkage. Thickness of the resulting film was 12 μm.

Static friction coefficient of this film was measured using a slip tester according to ASTM D-1894B. Surface roughness Ra of this film was measured according to JIS-B-0601 (cut-off: 0.08 mm). The results are shown in Table 1.

Examples 2 to 9

As fine particles, silica with an average particle diameter of 0.3 μm (Aerogil H-972, manufactured by Nippon Aerogil), silica with an average particle diameter of 0.9 μm (Silton AMT-08, manufactured by Mizusawa Kagaku Kokyo), extremely fine calcium carbonate with an average particle diameter of 0.06 μm, titania with an average particle diameter of 0.2 μm, powdery BaSO₄ with an average particle diameter of 0.6 μm (#100, manufactured by Sakai Kagaku), powdery Kaolin with an average particle diameter of 0.3 μm (ASP-072, manufactured by Engelhard Minerals And Chemical Corporation) were used and the contents were controlled in the same manner as that in Reference Exmaple 1 to obtain a composition.

The procedure in Example 1 was repeated using this composition. The results are shown in Table 1. In Example 3, styrene and p-methylstyrene (2.5 mol % based on styrene) were used as monomers during production of styrene polymer. In Example 5, polymerization temperature was changed. The film of Examples 2 to 9 were prepared so that thickness thereof may be 12 μm. The results are shown in Table 1.

Comparative Example 1

The procedures in Reference Example 1 and Example 1 were repeated, except that silica with an average particle diameter of 4 μm (Silton AMT-40, manufactured by Mizusawa Kagaku Kogyo) was used. The results are shown in Table 1.

Comparative Example 2

The procedures in Reference Example 1 and Example 1 were repeated, except that inorganic fine particles were not added. The results are shown in Table 1.

Comparative Example 3

The procedure of Reference Example 1 and Example 4 were repeated, except that inorganic fine particle content was increased. The results are shown in Table 1.

Example 10

The materials obtained in Reference Examples 2 and 3 were melted, heated and coextruded using two extruders equipped with T-dies for coextrusion at the tip thereof. The materials of Reference Example 2 and 3 were extruded at 320° C. by an extruder having a bore diameter of 25 mm and an extruder having a bore diameter of 40 mm, respectively.

The melt-extruded sheet was contacted on a cooling roll at 63° C. by electrostatic application to cool and solidify. Cooling rate was 55° C./sec. on an average and 130 μm thick sheet for stretching was obtained. This sheet was stretched in MD by three times at 110° C. and stretching rate of 6,000%/min. between rollers while circumferential speed of each roller was changed. Subsequently, the sheet was stretched in TD by three times at 120° C. and stretching rate of 6,000%/min using a tenter. Further, the sheet was re-stretched in MD by three times at 130° C. and 2,000%/min. while fixed in TD by a tenter. This film was fixed on a tenter, slightly relaxed and heat-treated at 255° C. for 10 seconds.

Thickness of the resulting film was 12 μm. Surface roughness of this film was measured according to JIS B-0601 (cut-off: 0.08 mm). Static friction coefficient was measured according to ASTM D-1894. The properties of the resulting film are shown in Table 2.

Example 11

The procedure in Reference Example 2 was repeated, except that silica with an average particle diameter of 0.9 μm (Silton AMT-08, manufactured by Mizusawa Kagaku Kogyo) was used, and a styrene polymer composition was prepared.

TABLE 1

| No. | Styrene[*1] Polymer | Weight[*2] Average Molecular Weight | Inorganic Fine Particles Kind | Average[*3] Particle Diameter (μm) | Content (wt %) | Surface[*4] Roughness Ra (μm) | Static[*5] Friction Coefficient μs |
|---|---|---|---|---|---|---|---|
| Example 1 | SPS | 369,000 | Silica | 0.08 | 0.5 | 0.009 | 0.58 |
| Example 2 | SPS | 369,000 | Silica | 0.3 | 0.5 | 0.019 | 0.45 |
| Example 3 | coSPS | 336,000 | Silica | 0.3 | 0.5 | 0.017 | 0.48 |
| Example 4 | SPS | 369,000 | Silica | 0.9 | 0.08 | 0.022 | 0.67 |
| Example 5 | SPS | 642,000 | Silica | 0.3 | 0.5 | 0.015 | 0.52 |
| Example 6 | SPS | 369,000 | Calcium carbonate | 0.06 | 0.3 | 0.008 | 0.55 |
| Example 7 | SPS | 366,000 | Titania | 0.2 | 0.5 | 0.017 | 0.49 |
| Example 8 | SPS | 369,000 | Barium sulfate | 0.6 | 0.3 | 0.021 | 0.56 |
| Example 9 | SPS | 366,000 | Kaolin | 0.3 | 0.4 | 0.020 | 0.54 |
| Comparative Example 1 | SPS | 369,000 | Silica | 4.0 | 0.5 | 0.056 | 0.85 |
| Comparative Example 2 | SPS | 369,000 | — | — | — | 0.005 | 1.12 |
| Comparative Example 3 | SPS | 369,000 | Silica | 0.9 | 2.0 | 0.034 | 0.25 |

[*1]SPS: syndiotactic polystyrene
coSPS: syndiotactic (styrene-p-methylstyrene) copolymer (p-methylstyrene content: 5 mol %)
[*2]Measured by gel permeation chromatography using 1,2,4-trichlorobenzene as a solvent
[*3]Dissolved in 1,2,4-trichlorobenzene and observed by microscope and measured
[*4]According to JIS-B0601 (cut-off: 0.08 mm)
[*5]According to ASTM D-1894B, measured by a slip tester
Thickness of all films in Examples and Comparative Examples: 12 μm Subsequently, the procedure in Example 10 was repeated, except that this styrene polymer composition was used instead of the material of Reference Example 2. The results are shown in Table 2.

Example 12

The procedure in Example 10 was repeated, except that pellet of styrene polymer of Reference Example 3 was used and 50/150/400/150/50 mesh was placed in the extruder, and film for stretching was prepared. This film was corona treated. Subsequently, a 0.5 wt % solution of styrene-divinyl benzene copolymer having a syndiotactic configuration obtained in Example 10 of Japanese Patent Application Laid-Open No. 95113/1989 (wherein divinyl benzene unit, 9.4 mol %, ethyl benzene unit, 5.0 mol %; weight average molecular weight, 360,000) in chloroform was prepared. Dry method silica (Aerogil TT-972 (diameter of primary particle, 0.3μ), manufactured by Nippon Aerogil) (0.5 wt % based on styrene-divinyl benzene copolymer) was added to the solution, and the resultant was mixed homogeneously in a cylindrical container using a homomixer type L (manufactured by Tokushu Kika Kogyo) to prepare a slurry solution. This slurry solution was coated on the above film using a bar coater, and dried at 250° C. for 10 seconds. The properties of the resulting film are shown in Table 2.

Example 13

The procedure in Example 12 was repeated, except that silica with an average particle diameter of 0.9 μm(Silton AMT-08, manufactured by Mizusawa Kagaku Kogyo) was used as silica. The results are shown in Table 2.

Comparative Example 4

The properties of the film of Example 12 before coating were examined. The results are shown in Table 2.

Example 14

The styrene polymer obtained in the above Reference Example 4 was completely dried under reduced pressure, then melted at 300° C., extruded by an extruder equipped with capillaries, and strand was cut into pellet. This pellet was crystallized using a hot air drier.

Subsequently, the resulting pellet was extruded at 320° C. using a uniaxial extruder equipped with a T-die at the tip thereof, cooled by a cooling roll at 70° C., solidified to prepare a raw sheet having crystallinity of 14%. Density of this raw sheet as measured using a density gradient tube was 1.05 g/cm$^3$. Cool crystallization temperature (Tcc) of the sheet was 151° C.

The raw sheet was heated by a roll, then stretched in MD by three times between nip rolls utilizing difference of circumferential speed to bring absolute value of birefringence (|Δn|) to 35×10$^{-3}$. Stretching rate was 3,000%/min and stretching temperature was 110° C. Birefringence (Δn) of the uniaxially stretched film was measured by Berek compensator set in a polarization microscope.

Subsequently, this uniaxially stretched film was fed into a continuous tenter and stretched in TD by three times at 120° C. and 3,000%/min., then heat treated at 260° C. for 10 seconds while fixed on a tenter.

In the above continuous production line, continuous molding for more than 4 hours was possible.

Density of the resulting film was 1.06 g/cm$^3$. The F-5 values (stress at 5% stretching) in MD and in TD as measured according to JIS C-2318 were good, i.e., 9 kg/mm$^2$ and 9.5 kg/mm$^2$, respectively. The results are shown in Table 3.

Example 15

The procedure in Example 14 was repeated, except that the stretching ratio in MD was 3.5 to bring the absolute value of birefringence (|Δn|) to 50×10$^{-3}$. The results are shown in Table 3.

Example 16

The procedure in Example 14 was repeated, except that the stretching ratio in MD was 2.5 to bring the absolute value of birefringence (|Δn|) to 22×10$^{-3}$. The results are shown in Table 3.

Example 17

A raw sheet having density of 1.04 g/cm$^3$ was prepared while cooling roll temperature was set at 60° C. during preparation of the raw sheet. The stretched film was produced in the same manner as that in Example 14 using the resulting sheet. The results are shown in Table 3.

TABLE 2

| No. | Lamination | Thickness (μm) | Surface Roughness Ra[1] (μm) Smooth/Rough | Static Friction Coefficient[2] | Surface Roughness of Rough Surface/ Surface Roughness of Smooth Surface |
|---|---|---|---|---|---|
| Example 10 | Coextrusion | 12 | 0.008/0.016 | 0.58 | 2.0 |
| Example 11 | Coextrusion | 12 | 0.007/0.028 | 0.33 | 4.0 |
| Example 12 | Coating | 14 | 0.006/0.022 | 0.39 | 3.7 |
| Example 13 | Coating | 14 | 0.006/0.035 | 0.31 | 5.8 |
| Comparative Example 4 | — | 12 | 0.006/0.008 | 1.12 | 1.3 |

[1]According to JIS B-0601 (cut-off: 0.08 mm)
[2]According to ASTM D-1894

Example 18

The procedure in Example 17 was repeated, except that the stretching ratio in MD was 3.5 to bring the absolute value of birefringence (|Δn|) to 48×10$^{-3}$. The results are shown in Table 3.

Example 19

The procedure in Example 17 was repeated, except that the stretching ratio in MD was 2.5 to bring the absolute value of birefringence (|Δn|) to 21×10$^{-3}$. The results are shown in Table 3.

Example 20

The procedure in Example 14 was repeated, except that temperature of stretching in TD was set at 180° C. The results are shown in Table 3.

Comparative Example 5

The procedure in Example 14 was repeated, except that stretching in TD was not carried out. Mechanical strength in MD of the resulting film was hardly improved. That is, useful biaxially stretched film was not obtained.

Example 21

The styrene polymer obtained in the above Reference Example 4 was completely dried under reduced pressure, then melted at 300° C., extruded by an extruder equipped with capillaries, and strand was cut into pellet. This pellet was crystallized using a hot air drier.

Subsequently, the resulting pellet was heated, melted and extruded at 320° C. using a uniaxial extruder equipped with a T-die at the tip thereof, cooled by a cooling roll at 70° C., solidified to prepare a sheet-like molded product. Density of this sheet as measured using a density gradient tube was 1.05 g/cm$^3$. Cool crystallization temperature of the sheet was 150° C. Crystallinity as determined by differential scanning calorimeter was 14%.

This sheet was heated by a roll, then stretched in MD by three times between nip rolls utilizing difference of circumferential speed (first stage). In this case, stretching rate was 6,000%/min. and stretching temperature was 110° C. The absolute value of birefringenece ($|\Delta n|$) of this uniaxially stretched film as determined by Berek compensator set in a polarization microscope was $-35 \times 10^{-3}$.

Subsequently, this uniaxially stretched film was stretched in TD by three times at 120° C. and 6,000%/min. by a tenter, then re-stretched in MD by twice at 6,000%/min. while fixed on the tenter.

This stretched film was heat-treated under state of tension at 260° C. for 10 seconds.

The mechanical strength, F-5 values in MD and in TD were measured according to JIS C-2318 were good. Further, heat shrinkage in each direction was measured without load after the sample was left at 200° C. for 30 minutes using an air oven. After sample was collected, birefringenece ($\Delta n$) was measured by a polarization microscope combined with Berek compensator at 23° C. and 50%RH. The results are shown in Table 4.

Example 22

The procedure in Example 21 was repeated, except that restretching ratio was 1.5. The results are shown in Table 4.

Example 23

The procedure in Example 21 was repeated, except that restretching ratio was 3. The results are shown in Table 4.

Example 24

The procedure in Example 21 was repeated, except that restretching ratio in MD in the first stage was 3.5. The results are shown in Table 4.

Example 25

The procedure in Example 24 was repeated, except that restretching ratio was 1.5. The results are shown in Table 4.

Example 26

The procedure in Example 24 was repeated, except that restretching ratio was 3. The results are shown in Table 4.

Example 27

The procedure in Example 21 was repeated, except that stretching in MD (2.5 times) was carried out at 105° C., stretching in TD (3 times) was carried out at 110° C. and restretching in MD (2.0 times) was carried out at 120° C., and heat-treatment was carried out at 250° C. The results are shown in Table 4.

Example 28

The procedure in Example 27 was repeated, except that stretching in MD was carried out at 130° C., stretching in TD was carried out at 130° C. and re-stretching in MD was carried out at 140° C., and heat-treatment was carried out at 230° C. The results are shown in Table 4.

Comparative Example 6

The procedure in Example 21 was repeated, except that stretching in TD and re-stretching were not carried out. The results are shown in Table 4.

Comparative Example 7

The procedure in Example 22 was repeated, except that stretching in TD in the first stage was not carried out. The results are shown in Table 4.

Example 29

The styrene polymer obtained in the above Reference Example 4 was completely dried under reduced pressure, then melted at 300° C., extruded by an extruder equipped with capillaries, and strand was cut into pellet. This pellet was crystallized using a hot air drier at 120° C.

Subsequently, the resulting pellet was melted and extruded at 320° C. using a uniaxial extruder equipped with a T-die at the tip thereof, and cast onto a cooling roll at 70° C. to obtain a sheet-like molded product.

This sheet-like molded product was fixed at both ends by chucks and simultaneously, biaxially stretched in MD and TD (three times, each) at 110° C. using an apparatus to change distance between chucks in TD as well as distance between adjacent chucks to enable stretching in MD.

The area of the film after simultaneous, biaxial stretching was 9 times as that of the sheet-like molded product.

Subsequently, this simultaneously, biaxially stretched film was re-stretched in MD by 2.0 times utilizing difference of circumferential speed of two pairs of nip rolls while heated at 120° C.

Total stretching ratio in MD which is a product of stretching ratio in MD during simultaneous, biaxial stretching and that during re-stretching in MD was 6.

This stretched film was heat-treated under state of tension at 260° C. for 2 minutes. Physical properties were measured in the same manner as that in Example 21. The results are shown in Table 5.

Example 30

The procedure in Example 29 was repeated, except that restretching ratio in MD was 1.5. The results are shown in Table 5.

Example 31

The procedure in Example 29 was repeated, except that restretching ratio in MD was 3.0. The results are shown in Table 5.

Example 32

The procedure in Example 29 was repeated, except that both stretching ratio in MD and that in TD during simultaneous, biaxial stretching were 3.5. The results are shown in Table 5.

Example 34

The procedure in Example 31 was repeated, except that both stretching ratio in MD and that in TD during simultaneous, biaxial stretching were 3.5. The results are shown in Table 5.

Comparative Example 8

The procedure in Example 29 was repeated, except that restretching was not carried out. The results are shown in Table 5.

TABLE 3

| | Density of Raw Sheet (g/cm$^3$) | Stretching in MD | | | Stretching in TD | | Heat Treatment Temp. (°C.) | Density of Heat-treated Film (g/cm$^3$) | Continuous*[1] Moldability | Mechanical*[2] Strength of Heat-treated Film |
|---|---|---|---|---|---|---|---|---|---|---|
| No. | | Temp. (°C.) | Magnification | Absolute value of Birefringence (\|Δn\|) | Temp. (°C.) | Magnification | | | | |
| Example 14 | 1.05 | 110 | 3.0 | 35 × 10$^{-3}$ | 120 | 3.0 | 260 | 1.06 | o | o |
| Example 15 | 1.05 | 110 | 3.5 | 50 × 10$^{-3}$ | 120 | 3.0 | 260 | 1.06 | o | o |
| Example 16 | 1.05 | 110 | 2.5 | 22 × 10$^{-3}$ | 120 | 3.0 | 260 | 1.05 | o | o |
| Example 17 | 1.04 | 110 | 3.0 | 32 × 10$^{-3}$ | 120 | 3.0 | 260 | 1.05 | o | o |
| Example 18 | 1.04 | 110 | 3.5 | 48 × 10$^{-3}$ | 120 | 3.0 | 260 | 1.05 | o | o |
| Example 19 | 1.04 | 110 | 2.5 | 21 × 10$^{-3}$ | 120 | 3.0 | 260 | 1.04 | o | o |
| Example 20 | 1.05 | 110 | 3.0 | 35 × 10$^{-3}$ | 180 | 3.0 | 260 | 1.05 | o | o |
| Comparative Example 5 | 1.05 | 110 | 1.0 | 2.8 × 10$^{-3}$ | 120 | 3.0 | 260 | 1.04 | o | x |

*[1]o: Continuous molding was possible for more than 4 hours in the production line
x: Continuous molding became impossible halfway in the production line, or continuous molding did not last for more than 4 hours in the production line.
*[2]o: Both of the F-5 values in MD and TD were not less than 7.0 kg/mm$^2$
x: Either of the F-5 values in MD and TD was less than 7.0 kg/mm$^2$
Measurement of F-5 value was conducted according to JIS C-2318.

TABLE 4

| | Stretching in MD | | | Stretching In TD | | Re-stretching in MD | | Total Stretching in MD | Total Area | Heat Treatment Temp. (°C.) | F-5 (kg/mm$^2$) | | Heat Shrinkage (%) | |
|---|---|---|---|---|---|---|---|---|---|---|---|---|---|---|
| No. | Temp. (°C.) | Magnification | \|Δn\| | Temp. (°C.) | Magnification | Temp. (°C.) | Magnification | | | | MD | TD | MD | TD |
| Example 21 | 110 | 3.0 | 35 × 10$^{-3}$ | 120 | 3.0 | 120 | 2.0 | 6.0 | 18.0 | 260 | 16.5 | 10.2 | 0.8 | 0.3 |
| Example 22 | 110 | 3.0 | 35 × 10$^{-3}$ | 120 | 3.0 | 120 | 1.5 | 4.5 | 13.5 | 260 | 15.4 | 11.3 | 0.7 | 0.3 |
| Example 23 | 110 | 3.0 | 35 × 10$^{-3}$ | 120 | 3.0 | 120 | 3.0 | 9.0 | 27.0 | 260 | 18.2 | 10.5 | 1.0 | 0.2 |
| Example 24 | 110 | 3.5 | 50 × 10$^{-3}$ | 120 | 3.0 | 120 | 2.0 | 7.0 | 21.0 | 260 | 17.5 | 10.2 | 0.9 | 0.2 |
| Example 25 | 110 | 3.5 | 50 × 10$^{-3}$ | 120 | 3.0 | 120 | 1.5 | 5.3 | 15.75 | 260 | 16.2 | 11.1 | 0.8 | 0.4 |
| Example 26 | 110 | 3.5 | 50 × 10$^{-3}$ | 120 | 3.0 | 120 | 3.0 | 10.5 | 31.5 | 260 | 19.1 | 10.2 | 1.1 | 0.2 |
| Example 27 | 105 | 2.5 | 20 × 10$^{-3}$ | 110 | 3.0 | 120 | 2.0 | 5.0 | 15.0 | 250 | 15.9 | 10.1 | 0.7 | 0.3 |
| Example 28 | 130 | 2.5 | 10 × 10$^{-3}$ | 130 | 3.0 | 140 | 2.0 | 5.0 | 15.0 | 230 | 15.1 | 10.1 | 0.6 | 0.3 |
| Comparative Example 6 | 110 | 3.0 | 35 × 10$^{-3}$ | — | — | — | — | 3.0 | 3.0 | 260 | 11.1 | 5.0 | 0.6 | 0.1 |
| Comparative Example 7 | 110 | 1.0 | 2.8 × 10$^3$ | 120 | 3.0 | 130 | 1.5 | 1.7 | 4.95 | 260 | 7.3 | 11.0 | 0.1 | 0.4 |

Example 33

The procedure in Example 30 was repeated, except that both stretching ratio in MD and that in TD during simultaneous, biaxial stretching were 3.5. The results are shown in Table 5.

TABLE 5

| No. | Simultaneous Biaxial Stretching | | | | Re-stretching | | Total Stretching in MD | F-5 (kg/mm$^2$) | | Heat Shrinkage (%) | |
|---|---|---|---|---|---|---|---|---|---|---|---|
| | Temp. (°C.) | Magnification in MD | Magnification in TD | Areal Magnification | in MD Temp. (°C.) | Magnification | | MD | TD | MD | TD |
| Example 29 | 110 | 3.0 | 3.0 | 9.0 | 120 | 2.0 | 6.0 | 16.8 | 11.2 | 0.8 | 0.4 |
| Example 30 | 110 | 3.0 | 3.0 | 9.0 | 120 | 1.5 | 4.5 | 15.8 | 11.5 | 0.8 | 0.3 |
| Example 31 | 110 | 3.0 | 3.0 | 9.0 | 120 | 3.0 | 9.0 | 18.1 | 10.9 | 1.0 | 0.2 |
| Example 32 | 110 | 3.5 | 3.5 | 12.25 | 120 | 2.0 | 7.0 | 18.3 | 12.7 | 1.0 | 0.3 |
| Example 33 | 110 | 3.5 | 3.5 | 12.25 | 120 | 1.5 | 5.3 | 17.4 | 11.8 | 0.8 | 0.5 |
| Example 34 | 110 | 3.5 | 3.5 | 12.25 | 120 | 3.0 | 10.5 | 19.4 | 11.1 | 1.0 | 0.4 |
| Comparative Example 8 | 110 | 3.0 | 3.0 | 9.0 | — | — | 3.0 | 8.2 | 8.5 | 0.4 | 0.3 |

Example 35

The styrene polymer obtained in the above Reference Example 4 was completely dried under reduced pressure, then melted at 300° C., extruded by an extruder equipped with capillaries, and strand was cut into pellet. This pellet was crystallized using a hot air drier at 120° C.

Subsequently, the resulting pellet was extruded at 320° C. using a uniaxial extruder equipped with a T-die at the tip thereof, cooled by a cooling roll at 70° C., solidified to prepare a raw sheet. Crystallinity of this raw sheet as measured using a deferential scanning calorimeter was 15%.

Cool crystallization temperature of this raw sheet was 150° C., glass transition temperature was 98° C., melting point was 270° C. and decomposition temperature was 322° C. This raw sheet was fixed at both ends by chucks and simultaneously, biaxially stretched in MD and TD (3.0 times, each) at 110° C. using an apparatus to change distance between chucks in TD as well as distance between adjacent chucks to enable stretching in MD. The area of the film after simultaneous, biaxially stretching was 9 times as that of the sheet-like molded product.

Subsequently, this simultaneously, biaxially stretched film was simultaneously, biaxially stretched again in MD and TD by 1.5 times using the aforementioned apparatus while heated at 120° C. Total area ratio of the film after simultaneous, biaxial re-stretching to that of the raw sheet-like molded product was 20.25.

The absolute value of birefringenece |Δn| was 2×10$^{-3}$.

The resulting film was heat-treated at 260° C. under state of tension for 2 minutes.

Stretching conditions, total area ratio, absolute value of birefringence |Δn|, F-5 value and ratio of F-5 value are shown in Table 6.

The F-5 value was measured according to JIS C-2318.

Example 36

The procedure in Example 35 was repeated, except that the simultaneous, biaxial stretching ratio in the second stage in MD and TD was 2. Stretching conditions, total area ratio, absolute value of birefringence |Δn|, F-5 value and ratio of F-5 value are shown in Table 6.

Example 37

The procedure in Example 35 was repeated, except that the simultaneous, biaxial stretching ratio in the second stage in MD and TD was 2.5. Stretching conditions, total area ratio, absolute value of birefringence |Δn|, F-5 value and ratio of F-5 value are shown in Table 6.

Example 38

The procedure in Example 35 was repeated, except that the simultaneous, biaxial stretching ratio in the first stage in MD and TD was 3.5. Stretching conditions, total area ratio, absolute value of birefringence |Δn|, F-5 value and ratio of F-5 value are shown in Table 6.

Example 39

The procedure in Example 36 was repeated, except that the simultaneous, biaxial stretching ratio in the first stage in MD and TD was 3.5. Stretching conditions, total area ratio, absolute value of birefringence |Δn|, F-5 value and ratio of F-5 value are shown in Table 6.

Example 40

The procedure in Example 35 was repeated, except that the material in Reference Example 5 was used. Stretching conditions, total area ratio, absolute value of birefringence |Δn|, F-5 value and ratio of F-5 value are shown in Table 6.

Comparative Example 9

The procedure in Example 35 was repeated, except that the simultaneous, biaxial stretching in the second stage was not carried out. Stretching conditions, total area ratio, absolute value of birefringence |Δn|, F-5 value and ratio of F-5 value are shown in Table 6.

Example 41

The styrene polymer obtained in the above Reference Example 4 was completely dried under reduced pressure, then melted at 300° C., extruded by an extruder equipped with capillaries, and strand was cut into pellet. This pellet was crystallized using a hot air drier at 120° C.

Subsequently, the resulting pellet was extruded at 320° C. using a uniaxial extruder equipped with a T-die at the tip thereof, cooled by a cooling roll at 70° C. to obtain a raw sheet.

This raw sheet was heated at 110° C. and stretched in MD by three times by a stretching machine utilizing difference of circumferential speed of rolls. The absolute value of birefringence of the stretched film as determined by Berek compensator was 35×10$^{-3}$.

Then, this raw sheet was fixed at both ends by chucks and stretched in TD by three times at 120° C. by a tenter which stretched the film in TD by changing distance between chucks.

Subsequently, simultaneous, biaxial stretching in MD and TD (1.5 times, each) was carried out at 120° C. using an apparatus to change distance between chucks in TD as well as distance between adjacent chucks to enable stretching in MD. The area of the film after stretching was 20 times as that of the raw sheet. The absolute value of birefringence of the film after simultaneous, biaxial stretching was $14 \times 10^{-3}$.

Stretching conditions in this example, total area ratio, absolute value of birefringence, F-5 value an ratio of F-5 value are shown in Table 7.

Example 42

The procedure in Example 41 was repeated, except that simultaneous, biaxial stretching ratio in MD was 2. Stretching conditions in this example, total area ratio, absolute value of birefringence, F-5 value and ratio of F-5 value are shown in Table 7.

Example 43

The procedure in Example 41 was repeated, except that simultaneous, biaxial stretching ratio in MD was 2.5 and the product after stretching was heat-treated at 260° C. for 20 seconds. Stretching conditions in this example, total area ratio, absolute value of birefringence, F-5 value and ratio of F-5 value are shown in Table 7.

Example 44

The procedure in Example 41 was repeated, except that stretching ratio in MD during the first stage was 3.5. Stretching conditions in this example, total area ratio, absolute value of birefringence, F-5 value and ratio of F-5 value are shown in Table 7.

Example 45

The procedure in Example 42 was repeated, except that stretching ratio in MD during the first stage was 3.5. Stretching conditions in this example, total area ratio, absolute value of birefringence, F-5 value and ratio of F-5 value are shown in Table 7.

Example 46

The procedure in Example 37 was repeated, except that stretching ratio in MD during the first stage was 3.5 and the product after stretching was heat-treated at 240° C. for 30 seconds. Stretching conditions in this example, total area ratio, absolute value of birefringence, F-5 value and ratio of F-5 value are shown in Table 7.

Example 47

The procedure in Example 41 was repeated, except that stretching in MD was carried out by 2.7 times at 110° C., stretching in TD by 2.7 times at 110° C., simultaneous, biaxial stretching by 1.3 times in each direction at 115° C. Stretching conditions in this example, total area ratio, absolute value of birefringence, F-5 value and ratio of F-5 value are shown in Table 7.

Comparative Example 10

The procedure in Example 42 was repeated, except that stretching in MD during the first step was not carried out. Stretching conditions in this example, total area ratio, absolute value of birefringence, F-5 value and ratio of F-5 value are shown in Table 7.

TABLE 6

| No. | Simultaneous Biaxial Stretching (First Stage) | | | | Simultaneously Biaxial Stretching (Second Stage) | | | Total Area Magnification | Birefringence $|\Delta n|$ | F-5 (kg/mm$^2$) | | Ratio of F-5 (MD/TD) |
|---|---|---|---|---|---|---|---|---|---|---|---|---|
| | Temp. (°C.) | Magnification in MD | Magnification in TD | Areal Magnification | Temp. (°C.) | Magnification in MD | Magnification in TD | | | MD | TD | |
| Example 35 | 110 | 3.0 | 3.0 | 9.0 | 120 | 1.5 | 1.5 | 20.25 | $1 \times 10^{-3}$ | 11.3 | 11.4 | 0.99 |
| Example 36 | 110 | 3.0 | 3.0 | 9.0 | 120 | 2.0 | 2.0 | 36.0 | $2 \times 10^{-3}$ | 13.1 | 12.9 | 1.02 |
| Example 37 | 110 | 3.0 | 3.0 | 9.0 | 120 | 2.5 | 2.5 | 56.25 | $1 \times 10^{-3}$ | 14.9 | 14.7 | 1.01 |
| Example 38 | 110 | 3.5 | 3.5 | 12.25 | 120 | 1.5 | 1.5 | 27.56 | $3 \times 10^{-3}$ | 12.2 | 12.4 | 0.98 |
| Example 39 | 110 | 3.5 | 3.5 | 12.25 | 120 | 2.0 | 2.0 | 49.0 | $2 \times 10^{-3}$ | 13.9 | 14.0 | 0.99 |
| Example 40 | 110 | 3.0 | 3.0 | 9.0 | 120 | 1.5 | 1.5 | 20.25 | $2 \times 10^{-3}$ | 11.7 | 11.3 | 1.04 |
| Comparative Example 9 | 110 | 3.0 | 3.0 | 9.0 | — | — | — | 9.0 | $2 \times 10^{-3}$ | 8.2 | 8.5 | 0.96 |

The raw sheet was an amorphous sheet molded using a cooling roll.
All heat treatments were conducted at 260° C.
Measurement of F-5 was conducted according to JIS C-2318.

TABLE 7

| No. | Stretching in MD | | | Stretching in TD | | Simultaneous Biaxial Stretching | | | Total Area Magnification | Birefringence $|\Delta n|$ | F-5 (kg/mm$^2$) | | Ratio of F-5 (MD/TD) |
|---|---|---|---|---|---|---|---|---|---|---|---|---|---|
| | Temp. (°C.) | Magnification | Birefringence $|\Delta n|$ | Temp. (°C.) | Magnification | Temp. (°C.) | MD | TD | | | MD | TD | |
| Example 41 | 110 | 3.0 | $35 \times 10^{-3}$ | 120 | 3.0 | 120 | 1.5 | 1.5 | 20 | $14 \times 10^{-3}$ | 11.4 | 12.5 | 0.912 |
| Example 42 | 110 | 3.0 | $35 \times 10^{-3}$ | 120 | 3.0 | 120 | 2.0 | 1.5 | 27 | $8 \times 10^{-3}$ | 13.2 | 12.8 | 1.031 |
| Example 43 | 110 | 3.0 | $35 \times 10^{-3}$ | 120 | 3.0 | 120 | 2.5 | 2.0 | 45 | $6 \times 10^{-3}$ | 14.5 | 14.1 | 1.028 |

TABLE 7-continued

| No. | Stretching in MD Temp. (°C.) | Mag- nifi- cation | Bire- fringence \|Δn\| | Stretching in TD Temp. (°C.) | Magnifi- cation | Simultaneous Biaxial Stretching Temp. (°C.) | Magnifi- cation MD | TD | Total Area Magnifi- cation | Bire- fringence \|Δn\| | F-5 (kg/mm²) MD | TD | Ratio of F-5 (MD/TD) |
|---|---|---|---|---|---|---|---|---|---|---|---|---|---|
| Example 44 | 110 | 3.5 | 50 × 10⁻³ | 120 | 3.0 | 120 | 1.5 | 1.5 | 24 | 20 × 10⁻³ | 13.2 | 12.1 | 1.090 |
| Example 45 | 110 | 3.5 | 50 × 10⁻³ | 120 | 3.0 | 120 | 2.0 | 1.5 | 24 | 7 × 10⁻³ | 14.8 | 14.6 | 1.014 |
| Example 46 | 110 | 3.5 | 50 × 10⁻³ | 120 | 3.0 | 120 | 2.5 | 2.0 | 32 | 4 × 10⁻³ | 15.2 | 14.8 | 1.027 |
| Example 47 | 110 | 2.7 | 26 × 10⁻³ | 110 | 2.7 | 115 | 1.3 | 1.3 | 12 | 15 × 10⁻³ | 10.5 | 10.9 | 0.963 |
| Comparative Example 10 | 110 | 1.0 | 2.8 × 10⁻³ | 120 | 3.0 | 120 | 2.0 | 1.5 | 4.5 | 45 × 10⁻³ | 6.1 | 11.2 | 0.545 |

The raw sheet was an amorphous sheet molded using a cooling roll.
Measurement of F-5 was conducted according to JIS C-2318.

Example 48

The polystyrene produced in Reference Example 4 was extruded at 320° C. to obtain a sheet-like molded product. Crystallinity of this sheet-like molded product as determined by differential scanning calorimeter was 14%. The sheet was sequentially stretched in MD and TD (three times, each) to obtain 15 μm thick biaxially stretched film. Further, the film was heat-treated at 250° C.

The resulting film was corona treated using corona treatment apparatus (HFS-203, manufactured by Kasuga Denki) under conditions of 28 W/m².min.

Surface tension of the corona treated, biaxially stretched film of polystyrene was 50 dyne/cm.

This film and a film of linear low density polyethylene (Idemitsu Unilax LS730C, 40 μm, manufactured by Idemitsu Sekiyu Kagaku) was adhered using two-pack adhesive (AD-308A, AD-308B, manufactured by Toyo Morton) to prepare a laminate film.

Peeling strength of the prepared laminate film was determined to 900 g. The result showed that the film had strong adhesiveness. Surface tension was measured according to JIS K6810 using surface wetting agent under conditions of 23° C. and 50%RH. Peeling strength of adhesiveness was measured by T-shape peeling method under the following conditions. Conditions for measurement of peeling strength:
Width of sample: 15 mm
Rate of pulling: 3 mm/min.

Example 49

The biaxially stretched film of Example 48 was plasma treated in a vacuum (0.5 Torr) under oxygen atmosphere using a plasma treatment apparatus which the present inventors manufactured by way of trial.

Surface tension of the resulting film was 52 dyne/cm. Ink for printing (polymate GT, manufactured by Toyo Ink) was coated onto the film, resulting in good printability free from bleeding. After boiling treatment at 95° C. for 30 minutes, the image was not peeled off with cellophane tape. The film was free from heat deformation even after heating at 200° C. for 30 minutes.

Example 50

The procedure in Example 49 was repeated, except that polystyrene film having surface tension of 40 dyne/cm which was obtained by setting treatment density conditions to 14 W/m².min. Printability and result of peeling test after boiling treatment were good.

Example 51

The styrene polymer having a syndiotactic configuration which was obtained in the above Reference Example 6 was dried at 120° to 150° C. for 2 to 5 hours, then extruded using a uniaxial extruder (diameter, 30 mm; L/D=26) wherein feed was 6.9 kg/hr., temperature distribution of the extruder around inlet, 290° C.; intermediate, 300° C.; at the tip, 310° C.; T-die, 310° C., to prepare a band (sheet) of 170 mm wide and 0.5 mm thick, which was rapidly cooled by a cooling roll at 60° C. Crystallinity of the product was 20%, unevenness of thickness was ±3%.

Subsequently, the band was rolled by pressure rolls at 120° C. to decrease thickness by 25%.

Elastic modulus and heat moldability of the resulting rolled product are shown in Table 8.

Examples 52 and 53

The procedure in Example 51 was repeated, except that decrease in thickness was 10% or 5%, and the band was rolled. Elastic modulus and heat moldability of the resulting rolled product are shown in Table 8.

Comparative Example 11

Elastic modulus and heat moldability of the band which was prepared in the same manner as that in Example 51 without rolling are shown in Table 8.

Comparative Example 12

The procedure in Example 51 was repeated except that general polystyrene having an atactic configuration (aPS) was used instead of polystyrene polymer having a syndiotactic configuration obtained in the above Reference Example 6. Elastic modulus and heat moldability of the resulting rolled product are shown in Table 8.

Comparative Example 13

Elastic modulus and heat moldability of the band obtained in the same manner as that in Comparative Example 12 without rolling are shown in Table 8.

TABLE 8

| No. | Resin | Decrease in Thickness (%) | Elastic Modulus (Kg/cm$^2$) | Heat Moldability*2 |
|---|---|---|---|---|
| Ex. 51 | SPS | 25 | 44,000 | o |
| Ex. 52 | SPS | 10 | 38,000 | o |
| Ex. 53 | SPS | 5 | 35,000 | o |
| Com. EX. 11 | SPS | 0 | 32,000 | x |
| Com. Ex. 12 | aPS*1 | 25 | 26,000 | o |
| Com. Ex. 13 | aPS | 0 | 25,000 | o |

*1General polystyrene (atactic configuration)
*2o: with less drawdown, without generation of bridge, etc.
x: with considerable drawdown, with generation of bridge, etc.

INDUSTRIAL AVAILABILITY

As mentioned above, the readily slidable film of the present invention is a film having high heat resistance, mechanical strength, chemical resistance, electrical insulating properties etc., and is excellent in sliding properties, smoothness and the like.

According to the process of the present invention, the above readily slidable film may be efficiently produced, and further surface properties may be improved by after-treatment, thus, readily slidable film excellent in heat resistance, printability, resistance to boiling and the like may be produced.

Accordingly, the film of the present invention is expected to be utilized efficiently and widely as various kinds of industrial films such as magnetic tape, magnetic disk, FPC, photographic film, condenser, package film and the like.

We claim:

1. A process for production of a readily slidable stretched syndiotactic polystyrene film comprising stretching and then restretching in a plurality of stages a styrene polymer having a high degree of syndiotactic configuration compounded with 0.001 to 1% by weight of inorganic fine particles having an average particle diameter of 0.01 to 3 μm, so that said film has a surface roughness, Ra, of 0.005 to 3 μm and has a static friction coefficient, μs, of 0.03 to 1.0, said stretching and restretching being a mode selected from the group consisting of (i) first stage: uniaxial stretching in the machine direction in a stretching ratio of 1.2 to 5 and at a temperature from a glass transition temperature to a cool crystallization temperature to obtain an absolute value of birefringence of said film of $3\times10^{-3}$ to $70\times10^{-3}$, second stage: uniaxial restretching in the transverse direction at a stretching ratio of 1.5 to 5 and at a temperature of 5° C. higher than a glass transition temperature to 30° C. lower than a melting point, third stage: uniaxial restretching in the machine direction; and (ii) first stage: biaxial stretching in the machine direction at a stretching ratio of 1.2 to 5 and in the transverse direction at a stretching ratio of 1.2 to 5 and at a temperature from a glass transition temperature to a cool crystallization temperature, second stage: uniaxial restretching in the machine direction.

2. The process according to claim 1, wherein the styrene polymer has a high degree of syndiotactic configuration or a composition thereof has a density of not more than 1.07 g/cm$^3$ and a crystallinity of 5 to 30%.

3. The process according to claim 1, wherein the styrene polymer has a high degree of syndiotactic configuration is obtained by heat-melting the styrene polymer having a syndiotactic configuration or a composition thereof at a temperature higher than a melting point of said styrene polymer and lower than a decomposition point+50° C., and cooling.

4. The process according to claim 1, wherein the total stretching ratio in the machine direction of the resulting film is 2.5 to 12.

5. The process according to claim 1, wherein the film obtained is further heat-treated.

6. The process according to claim 1, which further comprises carrying out a chemical and/or physical treatment to obtain a surface tension of the film partly or completely to not less than 35 dyne/cm.

7. A process for production of a rolled film product, comprising cooling and rolling a pre-molded product obtained by extruding or press molding of a styrene polymer having a high degree of syndiotactic configuration or a composition thereof such that there is a decrease of thickness of the film from 1 to 30%.

8. The process according to claim 7, wherein the rolling is carried out at glass transition temperature to 10° C. lower than melting point.

9. The process according to claim 7, which further comprises carrying out a chemical and/or physical treatment to partly or totally to obtain a surface tension of the film to not less than 35 dyne/cm$^2$.

10. The process according to claim 1, wherein the styrene polymer is a syndiotactic polystyrene having a residual aluminum content of not more than 3,000 ppm, a residual titanium content of not more than 10 ppm and a residual styrene monomer content of not more than 7,000 ppm; the inorganic fine particles being in an amount of 0.01 to 0.6 weight %, said particles having an average particle size of 0.01 to 1 μm and are selected from the group consisting of lithium fluoride, borax, magnesium carbonate, magnesium phosphate, magnesium oxide, magnesium chloride, mangesium acetate, magnesium fluoride, magnesium titanate, magnesium silicate, talc, calcium carbonate, calcium phosphate, calcium phosphite, calcium sulfate, calcium acetate, calcium terephthalate, calcium hydroxide, calcium silicate, calcium fluoride, calcium titanate, strontium titanate, barium carbonate, barium phosphate, barium sulfate, barium phosphite, titanium dioxide, titanium monooxide, titanium nitride, zirconium dioxide, zirconium monooxide, molybdenum dioxide, molybdenum trioxide, molybdenum sulfide, manganese chloride, manganese acetate, cobalt chloride, cobalt acetate, copper iodide, zinc oxide, zinc acetate, aluminum oxide, aluminum hydroxide, aluminum fluoride, aluminosilicate, silicon oxide, graphite, carnallite, kainite, isinglass and pyrolusite; and the stretching is carried out at a rate of $1\times10$ to $1\times10^5$%/minute; and the film having a thickness of 0.5 to 500 μm.

11. The process according to claim 5, wherein the heat treating is carried out at a temperature of between a melting point and 100° C. or more and the melting point and 5° C. or less for no more than 3 minutes.

12. The process according to claim 6, wherein the chemical and/or physical treatment: is selected from the group consisting of UV irridation treatment, plasma treatment, flame treatment and ozone treatment.

13. The process according to claim 1, wherein the film has a F-5 value in the machine direction and the transverse direction of at least 9 kg/mm$^2$ and a ratio of a F-5 value in the machine direction and the transverse direction of 0.75 to 1.25.

14. The process according to claim 1, wherein said stretching and restretching being carried out in the following three stages:

first stage: uniaxial stretching in the machine direction second stage: uniaxial restretching in the transverse direction third stage: uniaxial restretching in the machine direction.

15. The process according to claim 1, wherein said stretching and restretching are carried out in the following two stages:

first stage: biaxial stretching in the machine direction and the transverse direction and second stage: uniaxial restretching in the machine direction.

* * * * *

UNITED STATES PATENT AND TRADEMARK OFFICE
CERTIFICATE OF CORRECTION

PATENT NO. : 5,476,899
DATED : December 19, 1995
INVENTOR(S) : FUNAKI et al

It is certified that error appears in the above-indentified patent and that said Letters Patent is hereby corrected as shown below:

On the Title Page, item [54] and Column 1, line 1:
delete "FOR" and insert --TO--.

Column 40, line 62, (claim 12), after "treatment"
delete ":".

Signed and Sealed this

Twenty-third Day of June, 1998

Attest:

BRUCE LEHMAN

*Attesting Officer*   *Commissioner of Patents and Trademarks*